(12) United States Patent
Linden et al.

(10) Patent No.: US 10,584,526 B2
(45) Date of Patent: *Mar. 10, 2020

(54) PRIORITY DRIVEN POWER SIDE DOOR OPEN/CLOSE OPERATIONS

(71) Applicant: Ford Global Technologies, LLC, Dearborn, MI (US)

(72) Inventors: H. Paul Tsvi Linden, Southfield, MI (US); John Eddy, III, Ypsilanti, MI (US); Christopher Matthew Radjewski, Macomb, MI (US); Spencer Hicks, Pinckney, MI (US); John Thomas Ricks, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,442

(22) Filed: Jan. 10, 2019

(65) Prior Publication Data

US 2019/0145146 A1 May 16, 2019

Related U.S. Application Data

(63) Continuation of application No. 15/227,672, filed on Aug. 3, 2016, now Pat. No. 10,227,810.

(51) Int. Cl.
*E05F 15/611* (2015.01)
*B60R 13/04* (2006.01)
(Continued)

(52) U.S. Cl.
CPC ............... *E05F 15/611* (2015.01); *B60J 1/08* (2013.01); *B60J 5/047* (2013.01); *B60R 13/043* (2013.01);
(Continued)

(58) Field of Classification Search
CPC ......... E05F 15/616; E05F 15/40; E05F 15/75; E05F 15/611; B60R 25/24; B60R 13/043;
(Continued)

(56) References Cited

U.S. PATENT DOCUMENTS

| 2,229,909 | A | ‡ | 1/1941 | Wread ................ E05B 65/0021 292/17 |
| 2,553,023 | A | | 5/1951 | Walters |

(Continued)

FOREIGN PATENT DOCUMENTS

| CN | 1232936 C | ‡ | 12/2005 |
| CN | 1232936 C | | 12/2005 |

(Continued)

OTHER PUBLICATIONS

Kisteler Instruments, "Force Sensors Ensure Car Door Latch is Within Specification," Article, Jan. 1, 2005, 3 pages.‡

(Continued)

*Primary Examiner* — Chi Q Nguyen
(74) *Attorney, Agent, or Firm* — Vichit Chea; Price Heneveld LLP

(57) ABSTRACT

A vehicle door system includes a frameless door glass system, a powered latch, electrically-powered door presenter, powered door opening mechanism, and a powered door protector including a protective member that is movably mounted to the door structure. A controller selectively actuates the frameless door glass system, powered latch, powered door presenter, powered door opening mechanism, and powered door protector according to predefined criteria to coordinate the powered door functions and provide seamless powered operation.

20 Claims, 12 Drawing Sheets

(51) Int. Cl.

| | | |
|---|---|---|
| *E05B 81/14* | (2014.01) | |
| *E05B 81/20* | (2014.01) | |
| *E05F 15/40* | (2015.01) | |
| *E05F 15/75* | (2015.01) | |
| *B60J 1/08* | (2006.01) | |
| *B60J 5/04* | (2006.01) | |
| *B60R 25/24* | (2013.01) | |
| *E05B 81/04* | (2014.01) | |
| *E05B 81/58* | (2014.01) | |
| *E05B 81/64* | (2014.01) | |
| *E05B 81/70* | (2014.01) | |
| *E05B 81/76* | (2014.01) | |

(52) U.S. Cl.
CPC .............. *B60R 25/24* (2013.01); *E05B 81/04* (2013.01); *E05B 81/14* (2013.01); *E05B 81/20* (2013.01); *E05B 81/58* (2013.01); *E05B 81/64* (2013.01); *E05B 81/70* (2013.01); *E05F 15/40* (2015.01); *E05F 15/75* (2015.01); *E05B 81/76* (2013.01); *E05Y 2201/434* (2013.01); *E05Y 2400/32* (2013.01); *E05Y 2400/40* (2013.01); *E05Y 2400/44* (2013.01); *E05Y 2400/85* (2013.01); *E05Y 2900/531* (2013.01); *E05Y 2900/55* (2013.01)

(58) Field of Classification Search
CPC ... B60R 13/25; B60J 1/08; B60J 5/047; E05B 81/14; E05B 81/20; E05B 81/70; E05B 81/64; E05B 81/58; E05B 81/04; E05B 81/56; E05B 81/76; E05Y 2900/531; E05Y 2900/55; E05Y 2400/85; E05Y 2400/44; E05Y 2400/40; E05Y 2400/32; E05Y 2201/434
USPC .............................. 49/276, 277, 364, 28, 275
See application file for complete search history.

(56) References Cited

U.S. PATENT DOCUMENTS

| | | | | |
|---|---|---|---|---|
| 3,479,767 | A ‡ | 11/1969 | Lastinger | E05B 77/02 180/28 |
| 3,605,459 | A | 9/1971 | Van Dalen | |
| 3,751,718 | A ‡ | 8/1973 | Hanchett, Jr. | G07C 9/00698 307/10 |
| 3,771,823 | A | 11/1973 | Schnarr | |
| 3,854,310 | A ‡ | 12/1974 | Paull | E05B 47/0012 292/20 |
| 3,858,922 | A ‡ | 1/1975 | Yamanaka | E05B 53/00 292/33 |
| 4,193,619 | A ‡ | 3/1980 | Jerila | E05C 1/14 292/16 |
| 4,206,491 | A ‡ | 6/1980 | Ligman | G07C 9/0069 307/10 |
| 4,425,597 | A ‡ | 1/1984 | Schramm | G07C 9/00682 307/10 |
| 4,457,148 | A ‡ | 7/1984 | Johansson | G07C 9/00658 70/278 |
| 4,640,050 | A ‡ | 2/1987 | Yamagishi | B60J 5/06 49/139 |
| 4,672,348 | A ‡ | 6/1987 | Duve | H01F 5/04 336/19 |
| 4,674,230 | A ‡ | 6/1987 | Takeo | E05C 17/003 49/28 |
| 4,674,781 | A ‡ | 6/1987 | Reece | E05B 81/25 292/20 |
| 4,702,117 | A ‡ | 10/1987 | Tsutsumi | E05B 81/25 254/23 |
| 4,848,031 | A ‡ | 7/1989 | Yamagishi | E05B 81/20 49/280 |
| 4,858,971 | A ‡ | 8/1989 | Haag | E05B 77/48 292/20 |
| 4,889,373 | A ‡ | 12/1989 | Ward | E05B 13/002 292/33 |
| 4,929,007 | A ‡ | 5/1990 | Bartczak | E05B 83/36 292/21 |
| 5,018,057 | A ‡ | 5/1991 | Biggs | A45C 15/06 362/15 |
| 5,056,343 | A ‡ | 10/1991 | Kleefeldt | E05B 81/25 |
| 5,058,258 | A ‡ | 10/1991 | Harvey | E05B 47/0607 29/401 |
| 5,074,073 | A ‡ | 12/1991 | Zwebner | E05F 5/025 49/26 |
| 5,092,637 | A | 3/1992 | Miller | |
| 5,145,918 | A ‡ | 9/1992 | Larson | C08L 81/04 525/47 |
| 5,173,991 | A | 12/1992 | Carswell | |
| 5,239,779 | A ‡ | 8/1993 | DeLand | B60J 5/06 49/360 |
| 5,263,762 | A ‡ | 11/1993 | Long | E05B 81/20 296/14 |
| 5,297,010 | A ‡ | 3/1994 | Camarota | B60Q 3/267 340/43 |
| 5,332,273 | A ‡ | 7/1994 | Komachi | E05B 81/25 292/33 |
| 5,334,969 | A ‡ | 8/1994 | Abe | B60R 25/1009 180/12 |
| 5,494,322 | A ‡ | 2/1996 | Menke | E05B 77/26 292/20 |
| 5,497,641 | A ‡ | 3/1996 | Linde | E05B 81/14 180/28 |
| 5,535,608 | A ‡ | 7/1996 | Brin | E05B 13/002 |
| 5,547,208 | A ‡ | 8/1996 | Chappell | E05B 77/12 180/28 |
| 5,551,187 | A | 9/1996 | Brouwer et al. | |
| 5,581,230 | A ‡ | 12/1996 | Barrett | G08B 5/36 116/20 |
| 5,583,405 | A ‡ | 12/1996 | Sai | G01S 15/876 318/28 |
| 5,613,716 | A | 3/1997 | Cafferty | |
| 5,618,068 | A ‡ | 4/1997 | Mitsui | E05B 81/20 292/20 |
| 5,632,120 | A ‡ | 5/1997 | Shigematsu | E50B 81/20 |
| 5,632,515 | A ‡ | 5/1997 | Dowling | E05B 81/14 292/21 |
| 5,644,869 | A ‡ | 7/1997 | Buchanan, Jr. | E05F 15/652 49/362 |
| 5,653,484 | A ‡ | 8/1997 | Brackmann | E05B 77/28 292/21 |
| 5,662,369 | A ‡ | 9/1997 | Tsuge | B60N 2/366 292/22 |
| 5,684,470 | A ‡ | 11/1997 | DeLand | B60J 5/06 340/10 |
| 5,744,874 | A ‡ | 4/1998 | Yoshida | B60R 16/0315 307/10 |
| 5,755,059 | A ‡ | 5/1998 | Schap | B60J 5/06 49/360 |
| 5,783,994 | A ‡ | 7/1998 | Koopman, Jr. | B60R 25/24 307/10 |
| 5,802,894 | A ‡ | 9/1998 | Jahrsetz | E05B 77/48 292/14 |
| 5,808,555 | A ‡ | 9/1998 | Bartel | E05B 77/48 307/10 |
| 5,852,944 | A ‡ | 12/1998 | Collard, Jr. | E05B 47/0002 70/278 |
| 5,859,417 | A ‡ | 1/1999 | Dvorkis | G06K 7/10594 235/46 |
| 5,895,089 | A | 4/1999 | Singh et al. | |
| 5,896,026 | A ‡ | 4/1999 | Higgins | G07C 9/00896 320/16 |
| 5,896,768 | A ‡ | 4/1999 | Cranick | E05B 77/48 200/4 |
| 5,898,536 | A | 4/1999 | Won | |
| 5,901,991 | A ‡ | 5/1999 | Hugel | G07C 9/00182 292/20 |

(56) References Cited

U.S. PATENT DOCUMENTS

| | | | | |
|---|---|---|---|---|
| 5,921,612 A ‡ | 7/1999 | Mizuki | B60J 5/12 | 292/34 |
| 5,927,794 A ‡ | 7/1999 | Mobius | E05B 13/00 | |
| 5,964,487 A ‡ | 10/1999 | Shamblin | E05B 47/026 | 292/14 |
| 5,979,754 A ‡ | 11/1999 | Martin | G07C 9/00103 | 235/37 |
| 5,992,194 A ‡ | 11/1999 | Baukholt | E05B 47/009 | 292/20 |
| 6,000,257 A ‡ | 12/1999 | Thomas | E05B 81/14 | 292/20 |
| 6,027,148 A ‡ | 2/2000 | Shoemaker | E05B 47/0002 | 292/20 |
| 6,038,895 A ‡ | 3/2000 | Menke | B60R 25/24 | 70/223 |
| 6,042,159 A ‡ | 3/2000 | Spitzley | E05B 77/06 | 16/111 |
| 6,043,735 A ‡ | 3/2000 | Barrett | B60Q 3/217 | 180/27 |
| 6,050,117 A ‡ | 4/2000 | Weyerstall | E05B 77/12 | 292/20 |
| 6,056,076 A ‡ | 5/2000 | Bartel | E05B 77/48 | 180/16 |
| 6,065,316 A ‡ | 5/2000 | Sato | E05B 81/06 | 292/20 |
| 6,072,403 A ‡ | 6/2000 | Iwasaki | G07C 9/00309 | 180/28 |
| 6,075,294 A ‡ | 6/2000 | Van den Boom | E05B 81/78 | 307/10 |
| 6,089,626 A ‡ | 7/2000 | Shoemaker | E05B 47/0002 | 292/20 |
| 6,091,162 A ‡ | 7/2000 | Williams, Jr. | E05B 83/40 | 307/10 |
| 6,099,048 A ‡ | 8/2000 | Salmon | E05B 77/52 | 292/20 |
| 6,125,583 A ‡ | 10/2000 | Murray | E05B 81/20 | 49/291 |
| 6,130,614 A ‡ | 10/2000 | Miller | E05B 83/26 | 340/42 |
| 6,145,918 A | 11/2000 | Wilbanks, II | | |
| 6,157,090 A ‡ | 12/2000 | Vogel | E05B 77/26 | 307/10 |
| 6,181,024 B1 ‡ | 1/2001 | Geil | E05B 85/10 | 180/28 |
| 6,198,995 B1 ‡ | 3/2001 | Settles | B60R 16/0315 | 307/10 |
| 6,241,294 B1 ‡ | 6/2001 | Young | E05B 77/04 | 292/25 |
| 6,247,343 B1 ‡ | 6/2001 | Weiss | E05B 81/78 | 292/33 |
| 6,256,932 B1 ‡ | 7/2001 | Jyawook | E05B 77/24 | 292/33 |
| 6,271,745 B1 ‡ | 8/2001 | Anzai | G07C 9/00158 | 340/5 |
| 6,305,737 B1 | 10/2001 | Corder et al. | | |
| 6,341,448 B1 ‡ | 1/2002 | Murray | E05B 81/20 | 49/280 |
| 6,357,803 B1 | 3/2002 | Lorek | | |
| 6,361,091 B1 ‡ | 3/2002 | Weschler | E05B 83/24 | 292/22 |
| 6,405,485 B1 ‡ | 6/2002 | Itami | E05B 81/20 | 49/280 |
| 6,406,073 B1 | 6/2002 | Watanabe | | |
| 6,441,512 B1 ‡ | 8/2002 | Jakel | E05B 77/48 | 307/10 |
| 6,460,905 B2 ‡ | 10/2002 | Suss | E05B 85/12 | 292/33 |
| 6,470,719 B1 ‡ | 10/2002 | Franz | E05B 81/14 | 292/20 |
| 6,480,098 B2 ‡ | 11/2002 | Flick | B60R 25/1003 | 307/10 |
| 6,481,056 B1 | 11/2002 | Jesse | | |
| 6,515,377 B1 ‡ | 2/2003 | Ubelein | B60J 7/0573 | 307/10 |
| 6,523,376 B2 ‡ | 2/2003 | Baukholt | E05B 81/14 | 292/20 |
| 6,550,826 B2 ‡ | 4/2003 | Fukushima | E05B 81/14 | 292/20 |
| 6,554,328 B2 ‡ | 4/2003 | Cetnar | E05B 81/06 | 292/20 |
| 6,556,900 B1 ‡ | 4/2003 | Brynielsson | G01D 1/14 | 701/31 |
| 6,602,077 B2 ‡ | 8/2003 | Kasper | E05B 79/06 | 439/34 |
| 6,606,492 B1 ‡ | 8/2003 | Losey | B60R 25/04 | 307/10 |
| 6,629,711 B1 ‡ | 10/2003 | Gleason | E05B 83/36 | 292/20 |
| 6,639,161 B2 ‡ | 10/2003 | Meagher | E05B 81/76 | 200/34 |
| 6,657,537 B1 ‡ | 12/2003 | Hauler | B60R 25/24 | 180/28 |
| 6,659,515 B2 ‡ | 12/2003 | Raymond | E05B 81/20 | 292/20 |
| 6,701,671 B1 ‡ | 3/2004 | Fukumoto | E05B 77/26 | 292/33 |
| 6,712,409 B2 ‡ | 3/2004 | Monig | E05B 77/06 | 292/33 |
| 6,715,806 B2 ‡ | 4/2004 | Arlt | E05B 81/06 | 292/20 |
| 6,734,578 B2 ‡ | 5/2004 | Konno | B60R 25/02 | 307/10 |
| 6,740,834 B2 ‡ | 5/2004 | Sueyoshi | B60R 25/246 | 200/29 |
| 6,768,413 B1 ‡ | 7/2004 | Kemmann | G07C 9/00309 | 307/10 |
| 6,779,372 B2 ‡ | 8/2004 | Arlt | E05B 81/14 | |
| 6,783,167 B2 ‡ | 8/2004 | Bingle | E05B 83/26 | |
| 6,786,070 B1 ‡ | 9/2004 | Dimig | E05B 77/30 | 292/20 |
| 6,794,837 B1 ‡ | 9/2004 | Whinnery | H02H 7/0851 | 318/26 |
| 6,825,752 B2 ‡ | 11/2004 | Nahata | E05B 81/78 | 180/27 |
| 6,829,357 B1 ‡ | 12/2004 | Alrabady | H04L 9/0656 | 380/26 |
| 6,843,085 B2 ‡ | 1/2005 | Dimig | E05B 79/06 | 292/33 |
| 6,854,870 B2 ‡ | 2/2005 | Huizenga | B60Q 1/2669 | 362/39 |
| 6,879,058 B2 ‡ | 4/2005 | Lorenz | E05B 77/26 | 292/20 |
| 6,883,836 B2 ‡ | 4/2005 | Breay | F16L 5/025 | 285/14 |
| 6,883,839 B2 ‡ | 4/2005 | Belmont | E05B 77/12 | 292/20 |
| 6,910,302 B2 | 6/2005 | Crawford | | |
| 6,914,346 B2 ‡ | 7/2005 | Girard | E05B 77/12 | 307/10 |
| 6,923,479 B2 ‡ | 8/2005 | Aiyama | E05B 41/00 | 292/20 |
| 6,933,655 B2 ‡ | 8/2005 | Morrison | B60R 25/24 | 310/31 |
| 6,948,978 B2 ‡ | 9/2005 | Itou | H01R 13/4223 | 439/59 |
| 7,005,959 B2 ‡ | 2/2006 | Amagasa | E05B 81/78 | 307/10 |
| 7,038,414 B2 ‡ | 5/2006 | Daniels | E05F 15/46 | 318/28 |
| 7,055,997 B2 ‡ | 6/2006 | Baek | B60Q 1/2669 | 362/10 |
| 7,062,945 B2 ‡ | 6/2006 | Saitoh | B60R 25/246 | 49/460 |
| 7,070,018 B2 ‡ | 7/2006 | Kachouh | E05B 81/14 | 180/28 |
| 7,070,213 B2 ‡ | 7/2006 | Willats | E05B 81/76 | 292/20 |

(56) References Cited

U.S. PATENT DOCUMENTS

| | | | | |
|---|---|---|---|---|
| 7,090,285 B2 ‡ | 8/2006 | Markevich | E05B 85/12 | 296/15 |
| 7,091,823 B2 ‡ | 8/2006 | Ieda | E05B 81/78 | 292/33 |
| 7,091,836 B2 ‡ | 8/2006 | Kachouh | E05B 81/14 | 307/10 |
| 7,097,226 B2 ‡ | 8/2006 | Bingle | E05B 83/26 | 296/76 |
| 7,106,171 B1 ‡ | 9/2006 | Burgess | B60R 25/23 | 340/10 |
| 7,108,301 B2 ‡ | 9/2006 | Louvel | E05B 81/78 | 292/20 |
| 7,126,453 B2 ‡ | 10/2006 | Sandau | E05B 81/78 | 340/5 |
| 7,145,436 B2 ‡ | 12/2006 | Ichikawa | E05B 85/01 | 340/5 |
| 7,161,152 B2 ‡ | 1/2007 | DiPoala | G08B 13/191 | 250/33 |
| 7,170,253 B2 ‡ | 1/2007 | Spurr | E05B 81/06 | 318/28 |
| 7,173,346 B2 ‡ | 2/2007 | Aiyama | B60R 21/0136 | 307/10 |
| 7,176,810 B2 ‡ | 2/2007 | Inoue | G08G 1/096716 | 340/10 |
| 7,180,400 B2 ‡ | 2/2007 | Amagasa | E05B 81/78 | 340/5 |
| 7,192,076 B2 ‡ | 3/2007 | Ottino | B60J 5/0416 | 296/14 |
| 7,204,530 B2 ‡ | 4/2007 | Lee | E05B 85/12 | 292/33 |
| 7,205,777 B2 ‡ | 4/2007 | Schulz | E05B 81/78 | 307/10 |
| 7,221,255 B2 ‡ | 5/2007 | Johnson | G07C 5/008 | 340/10 |
| 7,222,459 B2 ‡ | 5/2007 | Taniyama | E05B 81/06 | 292/21 |
| 7,248,955 B2 ‡ | 7/2007 | Hein | B60K 37/06 | 200/31 |
| 7,263,416 B2 ‡ | 8/2007 | Sakurai | F02D 41/062 | 307/9 |
| 7,270,029 B1 ‡ | 9/2007 | Papanikolaou | E05B 81/14 | 185/37 |
| 7,325,843 B2 ‡ | 2/2008 | Coleman | E05B 81/14 | 292/20 |
| 7,342,373 B2 ‡ | 3/2008 | Newman | B60H 1/00735 | 318/28 |
| 7,360,803 B2 ‡ | 4/2008 | Parent | E05B 81/14 | 292/11 |
| 7,363,788 B2 ‡ | 4/2008 | Dimig | E05B 77/30 | 292/20 |
| 7,375,299 B1 ‡ | 5/2008 | Pudney | E05B 81/78 | 200/61 |
| 7,399,010 B2 ‡ | 7/2008 | Hunt | E05B 81/06 | 292/20 |
| 7,446,656 B2 ‡ | 11/2008 | Blakeway | G07C 9/00111 | 340/53 |
| 7,576,631 B1 ‡ | 8/2009 | Bingle | E05B 81/76 | 340/5 |
| 7,642,669 B2 ‡ | 1/2010 | Spurr | E05B 81/76 | 200/43 |
| 7,686,378 B2 ‡ | 3/2010 | Gisler | E05F 15/43 | 296/14 |
| 7,688,179 B2 ‡ | 3/2010 | Kurpinski | B60R 25/2036 | 340/4 |
| 7,705,722 B2 ‡ | 4/2010 | Shoemaker | B60H 1/249 | 296/14 |
| 7,747,286 B2 ‡ | 6/2010 | Conforti | H04B 1/3883 | 455/55 |
| 7,780,207 B2 ‡ | 8/2010 | Gotou | E05B 79/20 | 292/20 |
| 7,791,218 B2 ‡ | 9/2010 | Mekky | E05B 77/02 | 307/10 |
| 7,926,385 B2 ‡ | 4/2011 | Papanikolaou | E05B 81/14 | 185/37 |
| 7,931,314 B2 ‡ | 4/2011 | Nitawaki | B60R 25/246 | 292/33 |
| 7,937,893 B2 ‡ | 5/2011 | Pribisic | E05F 15/70 | 296/1 |
| 8,028,375 B2 ‡ | 10/2011 | Nakaura | E05F 15/48 | 16/82 |
| 8,093,987 B2 ‡ | 1/2012 | Kurpinski | B60R 25/2009 | 340/42 |
| 8,126,450 B2 ‡ | 2/2012 | Howarter | B60R 25/2009 | 455/42 |
| 8,141,296 B2 ‡ | 3/2012 | Bem | E05B 47/02 | 340/68 |
| 8,141,916 B2 ‡ | 3/2012 | Tomaszewski | E05B 77/26 | 292/20 |
| 8,169,317 B2 ‡ | 5/2012 | Lemerand | E05F 15/70 | 340/52 |
| 8,193,462 B2 ‡ | 6/2012 | Zanini | E05B 81/76 | 200/29 |
| 8,224,313 B2 ‡ | 7/2012 | Howarter | B60R 25/2009 | 455/41 |
| 8,272,165 B2 | 9/2012 | Tomioka | | |
| 8,376,416 B2 ‡ | 2/2013 | Arabia, Jr. | E05B 81/82 | 292/20 |
| 8,398,128 B2 ‡ | 3/2013 | Arabia | E05B 77/06 | 292/1 |
| 8,405,515 B2 ‡ | 3/2013 | Ishihara | B60R 25/246 | 340/10 |
| 8,405,527 B2 | 3/2013 | Chung et al. | | |
| 8,419,114 B2 ‡ | 4/2013 | Fannon | E05B 83/24 | 180/69 |
| 8,451,087 B2 ‡ | 5/2013 | Krishnan | B60J 5/04 | 292/22 |
| 8,454,062 B2 ‡ | 6/2013 | Rohlfing | E05B 81/78 | 292/33 |
| 8,474,889 B2 ‡ | 7/2013 | Reifenberg | E05B 79/06 | 292/33 |
| 8,532,873 B1 ‡ | 9/2013 | Bambenek | B62D 33/037 | 296/26 |
| 8,534,101 B2 ‡ | 9/2013 | Mette | E05B 47/0611 | 307/10 |
| 8,544,901 B2 ‡ | 10/2013 | Krishnan | E05B 81/14 | 292/20 |
| 8,573,657 B2 ‡ | 11/2013 | Papanikolaou | E05B 81/14 | 292/20 |
| 8,584,402 B2 | 11/2013 | Yamaguchi | | |
| 8,616,595 B2 ‡ | 12/2013 | Wellborn, Sr. | E05B 85/12 | 292/33 |
| 8,648,689 B2 ‡ | 2/2014 | Hathaway | B60K 28/12 | 292/21 |
| 8,690,204 B2 | 4/2014 | Lang et al. | | |
| 8,746,755 B2 ‡ | 6/2014 | Papanikolaou | E05B 81/14 | 292/20 |
| 8,826,596 B2 ‡ | 9/2014 | Tensing | B60R 13/043 | 49/460 |
| 8,833,811 B2 ‡ | 9/2014 | Ishikawa | E05B 17/106 | 292/33 |
| 8,903,605 B2 ‡ | 12/2014 | Bambenek | G07C 5/008 | 16/308 |
| 8,915,524 B2 ‡ | 12/2014 | Charnesky | E05B 79/20 | 292/21 |
| 8,963,701 B2 ‡ | 2/2015 | Rodriguez Barros | B60Q 1/323 | 340/43 |
| 8,965,287 B2 ‡ | 2/2015 | Lam | G07C 9/00309 | 455/41 |
| 9,003,707 B2 | 4/2015 | Reddmann | | |
| 9,076,274 B2 ‡ | 7/2015 | Kamiya | B60R 25/245 | |
| 9,159,219 B2 ‡ | 10/2015 | Magner | G08C 17/00 | |
| 9,184,777 B2 ‡ | 11/2015 | Esselink | H04B 1/3822 | |
| 9,187,012 B2 ‡ | 11/2015 | Sachs | B60N 2/22 | |
| 9,189,900 B1 ‡ | 11/2015 | Penilla | G07C 9/00007 | |
| 9,260,882 B2 ‡ | 2/2016 | Krishnan | E05B 81/14 | |
| 9,284,757 B2 ‡ | 3/2016 | Kempel | E05B 83/26 | |
| 9,322,204 B2 ‡ | 4/2016 | Suzuki | E05F 15/611 | |
| 9,353,566 B2 | 5/2016 | Miu et al. | | |

(56) References Cited

U.S. PATENT DOCUMENTS

| | | |
|---|---|---|
| 9,382,741 B2 | 7/2016 | Konchan et al. |
| 9,405,120 B2 ‡ | 8/2016 | Graf .................. G02B 27/0149 |
| 9,409,579 B2 ‡ | 8/2016 | Eichin ................ B60W 50/0205 |
| 9,416,565 B2 ‡ | 8/2016 | Papanikolaou .......... E05B 77/28 |
| 9,475,369 B2 | 10/2016 | Sugiura |
| 9,481,325 B1 | 11/2016 | Lange |
| 9,493,975 B1 | 11/2016 | Li |
| 9,518,408 B1 ‡ | 12/2016 | Krishnan ................ E05B 81/86 |
| 9,522,590 B2 | 12/2016 | Fujimoto et al. |
| 9,546,502 B2 ‡ | 1/2017 | Lange ................... E05B 85/08 |
| 9,551,166 B2 ‡ | 1/2017 | Patel .................. E05B 47/0657 |
| 9,725,069 B2 ‡ | 8/2017 | Krishnan ................ H04W 4/80 |
| 9,777,528 B2 ‡ | 10/2017 | Elie ........................ E05F 15/41 |
| 9,797,178 B2 ‡ | 10/2017 | Elie ........................ E05F 15/42 |
| 9,797,181 B2 | 10/2017 | Wheeler et al. |
| 9,834,964 B2 ‡ | 12/2017 | Van Wiemeersch .... E05B 85/14 |
| 9,845,071 B1 ‡ | 12/2017 | Krishnan ................ B60R 25/24 |
| 9,903,142 B2 ‡ | 2/2018 | Van Wiemeersch .... E05B 81/76 |
| 9,909,344 B2 ‡ | 3/2018 | Krishnan ............ G07C 9/00182 |
| 9,957,737 B2 ‡ | 5/2018 | Patel ...................... E05B 81/76 |
| 10,227,810 B2 * | 3/2019 | Linden ................... E05B 81/20 |
| 2001/0005078 A1 ‡ | 6/2001 | Fukushima ............ E05B 81/14 292/20 |
| 2001/0030871 A1 ‡ | 10/2001 | Anderson, Jr. ........... H01H 9/18 362/48 |
| 2002/0000726 A1 ‡ | 1/2002 | Zintler ................... E05B 81/90 292/21 |
| 2002/0111844 A1 | 8/2002 | Vanstory et al. |
| 2002/0121967 A1 ‡ | 9/2002 | Bowen .................... B60Q 1/52 340/42 |
| 2002/0186144 A1 | 12/2002 | Meunier |
| 2003/0009855 A1 ‡ | 1/2003 | Budzynski ............. E05B 81/78 16/443 |
| 2003/0025337 A1 ‡ | 2/2003 | Suzuki .................. E05B 81/20 292/19 |
| 2003/0038544 A1 ‡ | 2/2003 | Spurr ..................... E05B 41/00 307/10 |
| 2003/0101781 A1 ‡ | 6/2003 | Budzynski .............. E05B 85/10 70/239 |
| 2003/0107473 A1 ‡ | 6/2003 | Pang .................... B60R 25/246 340/5 |
| 2003/0111863 A1 ‡ | 6/2003 | Weyerstall .............. E05B 79/20 296/14 |
| 2003/0139155 A1 ‡ | 7/2003 | Sakai .................... B60R 25/24 455/12 |
| 2003/0172695 A1 ‡ | 9/2003 | Buschmann .......... E05B 13/105 70/361 |
| 2003/0182863 A1 ‡ | 10/2003 | Mejean ................... E05B 81/66 49/26 |
| 2003/0184098 A1 ‡ | 10/2003 | Aiyama ............... B60R 21/0136 292/21 |
| 2003/0216817 A1 | 11/2003 | Pudney |
| 2004/0061462 A1 | 4/2004 | Bent et al. |
| 2004/0093155 A1 ‡ | 5/2004 | Simonds ............. B60R 16/0231 701/53 |
| 2004/0124708 A1 ‡ | 7/2004 | Giehler ................ B60R 25/246 307/10 |
| 2004/0195845 A1 ‡ | 10/2004 | Chevalier ............... E05B 77/48 292/20 |
| 2004/0217601 A1 ‡ | 11/2004 | Garnault ................ E05B 81/78 292/33 |
| 2005/0057047 A1 | 3/2005 | Kachouch |
| 2005/0068712 A1 ‡ | 3/2005 | Schulz .................... E05B 81/78 361/28 |
| 2005/0216133 A1 ‡ | 9/2005 | MacDougall ........... E05B 41/00 701/1 |
| 2005/0218913 A1 ‡ | 10/2005 | Inaba ....................... G01D 5/24 324/67 |
| 2006/0056663 A1 ‡ | 3/2006 | Call ........................ B60R 25/25 382/11 |
| 2006/0100002 A1 ‡ | 5/2006 | Luebke ................. G06F 3/0362 455/57 |
| 2006/0186987 A1 | 8/2006 | Wilkins |
| 2007/0001467 A1 ‡ | 1/2007 | Muller .................... E05B 81/06 292/33 |
| 2007/0090654 A1 ‡ | 4/2007 | Eaton ..................... E05B 81/66 292/20 |
| 2007/0115191 A1 ‡ | 5/2007 | Hashiguchi ............. E05B 81/78 343/71 |
| 2007/0120645 A1 | 5/2007 | Nakashima |
| 2007/0126243 A1 ‡ | 6/2007 | Papanikolaou ......... E05B 81/06 292/20 |
| 2007/0132553 A1 ‡ | 6/2007 | Nakashima ............. B60R 25/24 340/5 |
| 2007/0170727 A1 ‡ | 7/2007 | Kohlstrand ............. E05B 83/12 292/21 |
| 2008/0021619 A1 ‡ | 1/2008 | Steegmann ............. E05B 81/78 701/49 |
| 2008/0060393 A1 ‡ | 3/2008 | Johansson ............. E05B 47/063 70/91 |
| 2008/0068129 A1 ‡ | 3/2008 | Ieda ...................... B60R 25/246 340/5 |
| 2008/0129446 A1 ‡ | 6/2008 | Vader ..................... B60R 25/24 340/5 |
| 2008/0143139 A1 | 6/2008 | Bauer et al. |
| 2008/0202912 A1 ‡ | 8/2008 | Boddie ................. H03K 17/962 200/60 |
| 2008/0203737 A1 ‡ | 8/2008 | Tomaszewski ......... E05B 77/26 292/21 |
| 2008/0211623 A1 ‡ | 9/2008 | Scheurich ............... G06F 21/32 340/5 |
| 2008/0217956 A1 ‡ | 9/2008 | Gschweng ............. E05B 77/26 296/14 |
| 2008/0224482 A1 ‡ | 9/2008 | Cumbo ................... E05B 77/02 292/21 |
| 2008/0230006 A1 ‡ | 9/2008 | Kirchoff ........... B29D 11/00865 118/69 |
| 2008/0250718 A1 ‡ | 10/2008 | Papanikolaou ......... E05B 81/14 49/287 |
| 2008/0296927 A1 ‡ | 12/2008 | Gisler ..................... E05F 15/43 296/14 |
| 2008/0303291 A1 ‡ | 12/2008 | Spurr ...................... E05B 81/14 292/21 |
| 2008/0307711 A1 | 12/2008 | Kern et al. |
| 2009/0033104 A1 ‡ | 2/2009 | Konchan .................. B60J 5/0416 292/21 |
| 2009/0033477 A1 ‡ | 2/2009 | Illium ................. B60R 21/0134 340/43 |
| 2009/0145181 A1 ‡ | 6/2009 | Pecoul .................... E05B 85/01 70/237 |
| 2009/0160211 A1 ‡ | 6/2009 | Krishnan ................. B60J 5/04 296/14 |
| 2009/0177336 A1 ‡ | 7/2009 | McClellan .......... B60R 25/2018 701/2 |
| 2009/0240400 A1 ‡ | 9/2009 | Lachapelle ............. B60R 25/04 701/45 |
| 2009/0257241 A1 ‡ | 10/2009 | Meinke ................. B60Q 1/2669 362/54 |
| 2010/0007463 A1 ‡ | 1/2010 | Dingman ............. B60Q 1/2669 340/5 |
| 2010/0005233 A1 ‡ | 3/2010 | Hosokawa ............. G06F 12/02 711/10 |
| 2010/0052337 A1 ‡ | 3/2010 | Arabia, Jr. .............. E05B 81/82 292/21 |
| 2010/0060505 A1 ‡ | 3/2010 | Witkowski ............ G08C 17/02 341/17 |
| 2010/0097186 A1 ‡ | 4/2010 | Wielebski ............. G05B 19/409 340/10 |
| 2010/0175945 A1 ‡ | 7/2010 | Helms ................... E05B 17/106 180/28 |
| 2010/0235057 A1 ‡ | 9/2010 | Papanikolaou ......... E05B 81/14 701/49 |
| 2010/0235058 A1 ‡ | 9/2010 | Papanikolaou ......... E05B 81/14 701/49 |
| 2010/0235059 A1 ‡ | 9/2010 | Krishnan ................ E05B 81/14 701/49 |
| 2010/0237635 A1 ‡ | 9/2010 | Ieda ........................ E05B 81/78 292/33 |

(56) References Cited

U.S. PATENT DOCUMENTS

| | | | | |
|---|---|---|---|---|
| 2010/0253535 A1‡ | 10/2010 | Thomas | H04B 1/082 | 340/4 |
| 2010/0265034 A1‡ | 10/2010 | Cap | B60R 25/245 | 340/5 |
| 2010/0315267 A1‡ | 12/2010 | Chung | B60R 25/24 | 341/22 |
| 2011/0041409 A1‡ | 2/2011 | Newman | E05F 15/46 | 49/324 |
| 2011/0060480 A1‡ | 3/2011 | Mottla | G06Q 10/02 | 701/2 |
| 2011/0148575 A1‡ | 6/2011 | Sobecki | E05B 85/103 | 340/5 |
| 2011/0154740 A1‡ | 6/2011 | Matsumoto | E05B 79/20 | 49/359 |
| 2011/0180350 A1‡ | 7/2011 | Thacker | E04G 7/307 | 182/18 |
| 2011/0203181 A1‡ | 8/2011 | Magner | G08C 17/00 | 49/324 |
| 2011/0203336 A1‡ | 8/2011 | Mette | E05B 47/0611 | 70/277 |
| 2011/0227351 A1‡ | 9/2011 | Grosdemouge | E05B 81/14 | 292/20 |
| 2011/0248862 A1‡ | 10/2011 | Budampati | G06F 3/023 | 340/67 |
| 2011/0252845 A1‡ | 10/2011 | Webb | E05B 13/108 | 70/101 |
| 2011/0254292 A1 | 10/2011 | Ishii | | |
| 2011/0313937 A1‡ | 12/2011 | Moore, Jr. | G06Q 30/0645 | 705/30 |
| 2012/0119524 A1‡ | 5/2012 | Bingle | E05B 81/28 | 292/33 |
| 2012/0154292 A1‡ | 6/2012 | Zhao | G06F 1/1626 | 345/17 |
| 2012/0180394 A1‡ | 7/2012 | Shinohara | E05F 15/00 | 49/349 |
| 2012/0205925 A1‡ | 8/2012 | Muller | E05B 77/04 | 292/33 |
| 2012/0228886 A1‡ | 9/2012 | Muller | E05B 85/107 | 292/33 |
| 2012/0252402 A1‡ | 10/2012 | Jung | H04M 1/72569 | 455/40 |
| 2013/0049403 A1 | 2/2013 | Fannon et al. | | |
| 2013/0069761 A1‡ | 3/2013 | Tieman | G07C 9/00119 | 340/5 |
| 2013/0079984 A1‡ | 3/2013 | Aerts | E05B 85/103 | 701/36 |
| 2013/0104459 A1‡ | 5/2013 | Patel | E05B 47/0657 | 49/70 |
| 2013/0127180 A1‡ | 5/2013 | Heberer | E05B 81/80 | 292/2 |
| 2013/0138303 A1‡ | 5/2013 | McKee | H02P 29/028 | 701/49 |
| 2013/0207794 A1‡ | 8/2013 | Patel | B60K 35/00 | 340/42 |
| 2013/0282226 A1‡ | 10/2013 | Pollmann | B60Q 1/50 | 701/29 |
| 2013/0295913 A1‡ | 11/2013 | Matthews, III | H04M 1/72577 | 455/42 |
| 2013/0311046 A1 | 11/2013 | Heberer et al. | | |
| 2013/0321065 A1‡ | 12/2013 | Salter | H03K 17/9622 | 327/51 |
| 2013/0325521 A1 | 12/2013 | Jameel | | |
| 2014/0000165 A1‡ | 1/2014 | Patel | E05B 81/76 | 49/31 |
| 2014/0007404 A1‡ | 1/2014 | Krishnan | E05B 81/14 | 29/428 |
| 2014/0015637 A1‡ | 1/2014 | Dassanayake | G07C 9/00174 | 340/5 |
| 2014/0088825 A1‡ | 3/2014 | Lange | E05B 81/64 | 701/36 |
| 2014/0129113 A1‡ | 5/2014 | Van Wiemeersch | F02D 28/00 | 701/10 |
| 2014/0150581 A1‡ | 6/2014 | Scheuring | F16H 25/2015 | 74/89 |
| 2014/0156111 A1‡ | 6/2014 | Ehrman | G06Q 30/0645 | 701/2 |
| 2014/0188999 A1 | 7/2014 | Leonard et al. | | |
| 2014/0200774 A1‡ | 7/2014 | Lange | E05B 77/54 | 701/49 |
| 2014/0227980 A1 | 8/2014 | Esselink et al. | | |
| 2014/0242971 A1‡ | 8/2014 | Aladenize | G07B 15/00 | 455/42 |
| 2014/0245666 A1‡ | 9/2014 | Ishida | E05F 15/655 | 49/349 |
| 2014/0256304 A1 | 9/2014 | Frye et al. | | |
| 2014/0278599 A1 | 9/2014 | Reh | | |
| 2014/0293753 A1‡ | 10/2014 | Pearson | G08C 23/02 | 367/19 |
| 2014/0338409 A1‡ | 11/2014 | Kraus | E05B 81/76 | 70/278 |
| 2014/0347163 A1‡ | 11/2014 | Banter | B60R 25/01 | 340/5 |
| 2015/0001926 A1‡ | 1/2015 | Kageyama | B60R 16/033 | 307/10 |
| 2015/0048927 A1‡ | 2/2015 | Simmons | G07C 9/00309 | 340/5 |
| 2015/0059250 A1‡ | 3/2015 | Miu | E05F 15/611 | 49/349 |
| 2015/0084739 A1‡ | 3/2015 | Lemoult | G06F 3/0202 | 340/5 |
| 2015/0149042 A1‡ | 5/2015 | Cooper | B60R 16/037 | 701/48 |
| 2015/0161832 A1‡ | 6/2015 | Esselink | G07C 9/00015 | 340/5 |
| 2015/0197205 A1‡ | 7/2015 | Xiong | B60R 16/037 | 701/49 |
| 2015/0240548 A1‡ | 8/2015 | Bendel | E05D 11/1078 | 701/49 |
| 2015/0294518 A1 | 10/2015 | Peplin | | |
| 2015/0330112 A1‡ | 11/2015 | Van Wiemeersch | E05B 81/76 | 292/20 |
| 2015/0330113 A1‡ | 11/2015 | Van Wiemeersch | E05B 77/26 | 292/33 |
| 2015/0330114 A1‡ | 11/2015 | Linden | E05B 81/00 | 292/19 |
| 2015/0330117 A1 | 11/2015 | Van Wiemeersch et al. | | |
| 2015/0330133 A1 | 11/2015 | Konchan et al. | | |
| 2015/0360545 A1‡ | 12/2015 | Nania | B60J 7/0573 | 296/22 |
| 2015/0371031 A1 | 12/2015 | Ueno et al. | | |
| 2016/0060909 A1‡ | 3/2016 | Krishnan | G07C 9/00182 | 292/19 |
| 2016/0130843 A1‡ | 5/2016 | Bingle | E05B 47/0009 | 292/24 |
| 2016/0138306 A1‡ | 5/2016 | Krishnan | E05B 81/14 | 292/20 |
| 2016/0153216 A1‡ | 6/2016 | Funahashi | E05B 81/80 | 292/2 |
| 2016/0273255 A1 | 9/2016 | Suzuki et al. | | |
| 2016/0326779 A1‡ | 11/2016 | Papanikolaou | E05B 77/28 | |
| 2017/0014039 A1‡ | 1/2017 | Pahlevan | A61B 5/0004 | |
| 2017/0022742 A1 | 1/2017 | Seki et al. | | |
| 2017/0058588 A1 | 3/2017 | Wheeler et al. | | |
| 2017/0074006 A1‡ | 3/2017 | Patel | E05B 47/0657 | |
| 2017/0089115 A1‡ | 3/2017 | Wang | E05F 15/603 | |
| 2017/0247016 A1‡ | 8/2017 | Krishnan | H04W 4/80 | |
| 2017/0270490 A1 | 9/2017 | Penilla et al. | | |
| 2017/0306662 A1 | 10/2017 | Och et al. | | |
| 2017/0349146 A1‡ | 12/2017 | Krishnan | B60R 25/241 | |
| 2018/0038147 A1‡ | 2/2018 | Linden | E05F 15/616 | |
| 2018/0051493 A1‡ | 2/2018 | Krishnan | G07C 9/00182 | |
| 2018/0051498 A1 | 2/2018 | Van Wiemeersch et al. | | |
| 2018/0058128 A1 | 3/2018 | Khan et al. | | |
| 2018/0065598 A1 | 3/2018 | Krishnan | | |

(56) References Cited

U.S. PATENT DOCUMENTS

| | | |
|---|---|---|
| 2018/0080270 A1 | 3/2018 | Khan et al. |
| 2018/0128022 A1 | 5/2018 | Van Wiemeersh et al. |

FOREIGN PATENT DOCUMENTS

| | | | |
|---|---|---|---|
| CN | 201198681 Y | 2/2009 | |
| CN | 201198681 Y ‡ | 2/2009 | |
| CN | 201280857 | 7/2009 | |
| CN | 101527061 A | 9/2009 | |
| CN | 101527061 A ‡ | 9/2009 | |
| CN | 131527061 A ‡ | 9/2009 | |
| CN | 201567872 U ‡ | 9/2010 | |
| CN | 201567872 U | 9/2010 | |
| CN | 101932466 A | 12/2010 | |
| CN | 101932466 A ‡ | 12/2010 | B60J 5/101 |
| CN | 201915717 U | 8/2011 | |
| CN | 201915717 U ‡ | 8/2011 | |
| CN | 202200933 U | 4/2012 | |
| CN | 202200933 U ‡ | 4/2012 | |
| CN | 202686247 U | 1/2013 | |
| CN | 202686247 U ‡ | 1/2013 | |
| CN | 103206117 A | 7/2013 | |
| CN | 103206117 A ‡ | 7/2013 | |
| CN | 103264667 A ‡ | 8/2013 | |
| CN | 103264667 A | 8/2013 | |
| CN | 203511548 U | 4/2014 | |
| CN | 203511548 U ‡ | 4/2014 | |
| CN | 204326814 U | 5/2015 | |
| CN | 204326814 U ‡ | 5/2015 | |
| DE | 4403655 A1 ‡ | 8/1995 | B60R 25/04 |
| DE | 4403655 A1 | 8/1995 | |
| DE | 19620059 A1 | 11/1997 | |
| DE | 19620059 A1 ‡ | 11/1997 | E05B 81/78 |
| DE | 19642698 A1 | 4/1998 | |
| DE | 19642698 A1 ‡ | 4/1998 | E05B 77/12 |
| DE | 19642698-AI ‡ | 4/1998 | E05B 77/12 |
| DE | 19642698 A2 ‡ | 11/2000 | |
| DE | 19642698 A2 | 11/2000 | |
| DE | 10212794 A1 ‡ | 6/2003 | B29C 45/14 |
| DE | 10212794 A1 | 6/2003 | |
| DE | 20121915 U1 ‡ | 11/2003 | E05B 77/48 |
| DE | 20121915 U1 | 11/2003 | |
| DE | 10309821 A ‡ | 9/2004 | E05B 77/02 |
| DE | 10309821 A1 ‡ | 9/2004 | E05B 77/02 |
| DE | 10309821 A1 | 9/2004 | |
| DE | 102005041551 A1 | 3/2007 | |
| DE | 1020050415541 A1 ‡ | 3/2007 | |
| DE | 102006029774 A1 | 1/2008 | |
| DE | 102006029774 A1 ‡ | 1/2008 | E05B 81/78 |
| DE | 102006040211 A1 | 3/2008 | |
| DE | 102006041928 A1 ‡ | 3/2008 | B60K 37/06 |
| DE | 102006041928 A1 | 3/2008 | |
| DE | 102010052582 A1 | 5/2012 | |
| DE | 102010052582 A1 ‡ | 5/2012 | B60W 30/14 |
| DE | 102011051165 A1 | 12/2012 | |
| DE | 102011051165 A1 ‡ | 12/2012 | E05B 15/1635 |
| DE | 102015101164 A1 ‡ | 7/2015 | E05B 81/77 |
| DE | 102015101164 A1 | 7/2015 | |
| DE | 102014107809 A1 | 12/2015 | |
| DE | 102014107809 A1 ‡ | 12/2015 | E05B 81/77 |
| EP | 0372791 A2 ‡ | 6/1990 | G07C 9/00182 |
| EP | 0372791 A2 | 6/1990 | |
| EP | 0694664 A ‡ | 1/1996 | E05B 77/48 |
| EP | 0694664 A1 | 1/1996 | |
| EP | 0694664 A1 ‡ | 1/1996 | E05B 77/48 |
| EP | 1162332 A1 ‡ | 12/2001 | E05B 81/76 |
| EP | 1162332 A1 | 12/2001 | |
| EP | 1284334 A ‡ | 2/2003 | E05B 81/76 |
| EP | 1284334 A1 | 2/2003 | |
| EP | 1284334 A1 ‡ | 2/2003 | E05B 81/76 |
| EP | 1288403 A2 | 3/2003 | |
| EP | 1288403 A2 ‡ | 3/2003 | E05B 41/00 |
| EP | 1284334 A ‡ | 9/2003 | E05B 81/76 |
| EP | 1284334 A1 | 9/2003 | |
| EP | 1284334 A1 ‡ | 9/2003 | E05B 81/76 |
| EP | 1460204 A2 | 9/2004 | |
| EP | 1460204 A2 ‡ | 9/2004 | E05B 81/78 |
| EP | 1465119 A1 | 10/2004 | |
| EP | 1465119 A1 ‡ | 10/2004 | E05B 81/78 |
| EP | 1465119-AI ‡ | 10/2004 | E05B 81/78 |
| EP | 1338731 A2 | 2/2005 | |
| EP | 1338731 A2 ‡ | 2/2005 | B60R 21/0136 |
| EP | 1944436 A2 ‡ | 7/2008 | E05B 81/76 |
| EP | 1944436 A2 | 7/2008 | |
| EP | 2053744 A2 ‡ | 4/2009 | E05B 81/78 |
| EP | 2053744 A2 | 4/2009 | |
| EP | 2314803 A2 ‡ | 4/2011 | E05B 77/34 |
| EP | 2314803 A2 | 4/2011 | |
| FR | 2698838 A1 ‡ | 6/1994 | B60J 5/0472 |
| FR | 2698838 A1 | 6/1994 | |
| FR | 2783547 A ‡ | 3/2000 | B60Q 1/323 |
| FR | 2783547 A1 | 3/2000 | |
| FR | 2783547 A1 ‡ | 3/2000 | B60Q 1/323 |
| FR | 2841285 A1 ‡ | 12/2003 | E05B 17/005 |
| FR | 2841285 A1 | 12/2003 | |
| FR | 2860261 A1 | 4/2005 | |
| FR | 2948402 A ‡ | 7/2009 | E05B 77/06 |
| FR | 2948402 A1 ‡ | 7/2009 | E05B 77/06 |
| FR | 2948402 A1 | 7/2009 | |
| FR | 2955604 A1 | 7/2011 | |
| FR | 2955604 A1 ‡ | 7/2011 | E05B 81/78 |
| GB | 2402840 A ‡ | 12/2004 | B60R 25/04 |
| GB | 2402840 A | 12/2004 | |
| GB | 2496754 A ‡ | 5/2013 | B60R 25/24 |
| GB | 2496754 A | 5/2013 | |
| JP | 62255256 A | 11/1987 | |
| JP | 62255256 A ‡ | 11/1987 | |
| JP | 05059855 A ‡ | 3/1993 | |
| JP | 05059855 A | 3/1993 | |
| JP | 406167156 A | 6/1994 | |
| JP | 406167156 A ‡ | 6/1994 | |
| JP | 40618520 A ‡ | 7/1994 | |
| JP | 406185250 A | 7/1994 | |
| JP | 2000064685 A | 2/2000 | |
| JP | 2000064685 A ‡ | 2/2000 | |
| JP | 2000314258 A | 11/2000 | |
| JP | 2000314258 A ‡ | 11/2000 | |
| JP | 2007100342 A | 4/2007 | |
| JP | 2007138500 A ‡ | 6/2007 | |
| JP | 2007138500 A | 6/2007 | |
| KR | 20030025738 A | 3/2003 | |
| KR | 20030025738 A ‡ | 3/2003 | |
| KR | 20120108580 A ‡ | 10/2012 | |
| KR | 20120108580 A | 10/2012 | |
| WO | 0123695 A1 | 4/2001 | |
| WO | WO-0123695 A1 ‡ | 4/2001 | B60R 25/04 |
| WO | 03095776 A1 | 11/2003 | |
| WO | WO-03095776 A ‡ | 11/2003 | B60R 25/246 |
| WO | WO-03095776 A1 ‡ | 11/2003 | B60R 25/246 |
| WO | 2013111615 A1 | 8/2013 | |
| WO | WO-2013111615 A1 ‡ | 8/2013 | E05B 81/78 |
| WO | 2013146918 A1 | 10/2013 | |
| WO | WO-2013146918 A1 ‡ | 10/2013 | E05B 77/06 |
| WO | 2014146186 A1 | 9/2014 | |
| WO | WO-2014146186 A1 ‡ | 9/2014 | G07C 9/00309 |
| WO | 2015064001 A1 | 5/2015 | |
| WO | 2015145868 A1 | 10/2015 | |
| WO | 2017160787 A2 | 9/2017 | |

OTHER PUBLICATIONS

General Motors Corporation, 2006 Chevrolet Corvette Owner Manual, © 2005 General Motors Corporation, 4 pages.‡

General Motors LLC, 2013 Chevrolet Corvette Owner Manual, 2012, 17 pages.‡

General Motors, "Getting to Know Your 2014 Corvette," Quick Reference Guide, 2013, 16 pages.‡

InterRegs Ltd., Federal Motor Vehicle Safety Standard, "Door Locks and Door Retention Components," 2012, F.R. vol. 36 No. 232—Feb. 12, 1971, 23 pages.‡

Ross Downing, "How to Enter & Exit a Corvette With a Dead Battery," YouTube video http://www.youtube.com/watch?v=DLDqmGQU6L0, Jun. 6, 2011, 1 page.‡

(56) References Cited

OTHER PUBLICATIONS

Jeff Glucker, "Friends videotape man 'trapped' inside C6 Corette with dead battery," YouTube via Corvett Online video http://www.autoblog.com/2011/05/14/friends-videotape-man-trapped-inside-c6-corvette-with-dead-bat/, May 14, 2011, 1 page.‡
Don Roy, "ZR1 Owner Calls 911 After Locking Self in Car," website http://www.corvetteonline.com/news/zrl-owner-calls-911-after-locking-self-in-car/, Apr. 13, 2011, 2 pages.‡
Zach Bowman, "Corvette with dead battery traps would-be thief," website http://www.autoblog.com/2011/10/25/corvette-with-dead-battery-traps-would-be-thief/, Oct. 25, 2011, 2 pages.‡
U.S. Appl. No. 14/468,634, filed Aug. 26, 2014. 15 pages.‡
U.S. Appl. No. 13/608,303, filed Sep. 10, 2012, 15 pages.‡
U.S. Appl. No. 14/281,998, filed May 20, 2014, 20 pages.‡
U.S. Appl. No. 14/282,224, filed May 20, 2014, 15 pages.‡
U.S. Appl. No. 14/276,415, filed May 13, 2014, 18 pages.‡
Office Action dated Mar. 10, 2017, U.S. Appl. No. 15/174,206, filed Jun. 6, 2016, 17 pages.‡
Hyundai Bluelink, "Send Directions to your car," Link to App, 2015, 3 pages.‡
Bryan Laviolette, "GM's New App Turns Smartphones into Virtual Keys," Article, Jul. 22, 2010, 2 pages.‡
Zipcar.com, "Car Sharing from Zipcar: How Does car Sharing Work?" Feb. 9, 2016, 6 pages.‡
Department of Transportation, "Federal Motor Vehicle Safety Standards; Door Locks and Door Retention Components and Side Impact Protection," http://www.nhtsa.gov/cars/rules/rulings/DoorLocks/DoorLocks_NPRM.hlml#VI_C, 23 pages. Aug. 28, 2010.‡
"Push Button to open your car door" Online video clip. YouTube, Mar. 10, 2010. 1 page.‡
Car of the Week: 1947 Lincoln convertible by: bearnest May 29, 2012 http://www.oldcarsweekly.com/car-of-the-week/car-of-the-week-1947-lincoln-convertible. 7 pages.‡
U.S. Appl. No. 14/276,415, Office Action dated Mar. 28, 2018, 19 pages.‡
U.S. Appl. No. 12/402,744, Office Action dated Oct. 23, 2013, 7 pages.‡
U.S. Appl. No. 12/402,744, Advisory Action dated Jan. 31, 2014, 2 pages.‡
U.S. Appl. No. 14/280,035, filed May 16, 2014, entitled "Powered Latch System for Vehicle Doors and Control System Therefor."‡
U.S. Appl. No. 14/281,998, filed May 20, 2014, entitled "Vehicle Door Handle and Powered Latch System."‡
U.S. Appl. No. 14/282,224, filed May 20, 2014, entitled "Powered Vehicle Door Latch and Exterior Handle With Sensor."‡
George Kennedy, "Keyfree app replaces conventional keys with your smart phone," website, Jan. 5, 2015, 2 pages.‡
Hyundai Motor India Limited, "Hyundai Care," website, Dec. 8, 2015, 3 pages.‡
Keyfree Technologies Inc., "Keyfree," website, Jan. 10, 2014, 2 pages.‡
PRWEB, "Keyfree Technologies Inc. Launches the First Digital Car Key," Jan. 9, 2014, 3 pages.‡
Jeff Glucker, "Friends videotape man 'trapped' inside C6 Corette with dead battery," YouTube via Corvett Online video http://www.autoblog.com/2011/05714/friends-videotape-man-trapped-inside-c6-corvette-with-dead-bad/, May 14, 2011, 1 page.‡
Department of Transportation, "Federal Motor Vehicle Safety Standards; Door Locks and Door Retention Components and Side Impact Protection," http://www.nhtsa.gov/cars/rules/rulings/DoorLocks/DoorLocks_NPRM.html#VI_C, 23 pages, Aug. 28, 2010.‡
Don Roy, "ZR I Owner Calls 911 After Locking Self in Car," website http://www.corvetteonline.com/news/zr1-owner-calls-911-after-locking-self-in-car/, Apr. 13, 2011, 2 pages.‡
Don Roy, "ZR1 Owner Calls 911 After Locking Self in Car," website http://www.corvetteonline.com/news/zr1-owner-calls-911-after-locking-self-in-car/, Apr. 13, 2011, 2 pages.‡
Car of the Week: 1947 Lincoln convertible by: bearnest May 29, 2012 hup://www.oldcarsweekly.com/car-of-the-week/car-of-the-week-1947-lincoln-convertible. 7 pages.‡
General Motors Corporation, 2006 Chevrolet Corvette Owner Manual, © 2005 General Motors Corporation (month unknown), 4 pages.
General Motors LLC, 2013 Chevrolet Corvette Owner Manual, © 2012 General Motors LLC (month unknown), 17 pages.
General Motors, "Getting to Know Your 2014 Corvette," Quick Reference Guide, Copyright 2013 General Motors (month unknown), 16 pages.
Don Roy, "ZR1 Owner Calls 911 After Locking Self in Car," website http://www.corvetteonline.com/news/zr1-owner-aalls-911-after-locking-self-in-car/, Apr. 13, 2011, 2 pages.
Hyundai Bluelink, "Send Directions to your car," Link to App, 2015 (month unknown), 3 pages.

\* cited by examiner
‡ imported from a related application

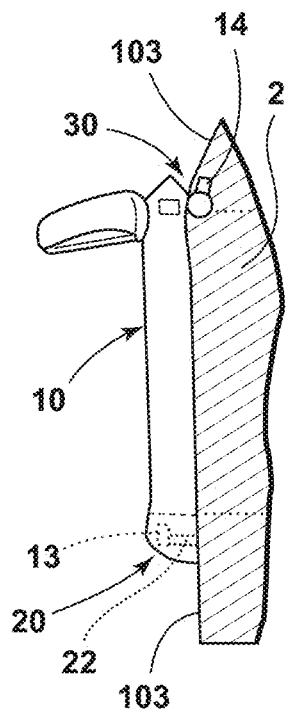
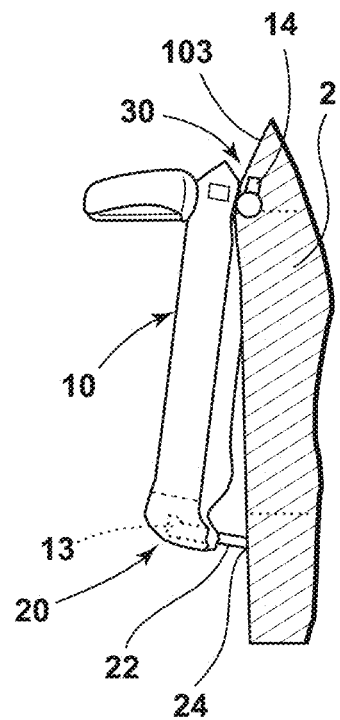
FIG. 7　　　　FIG. 8
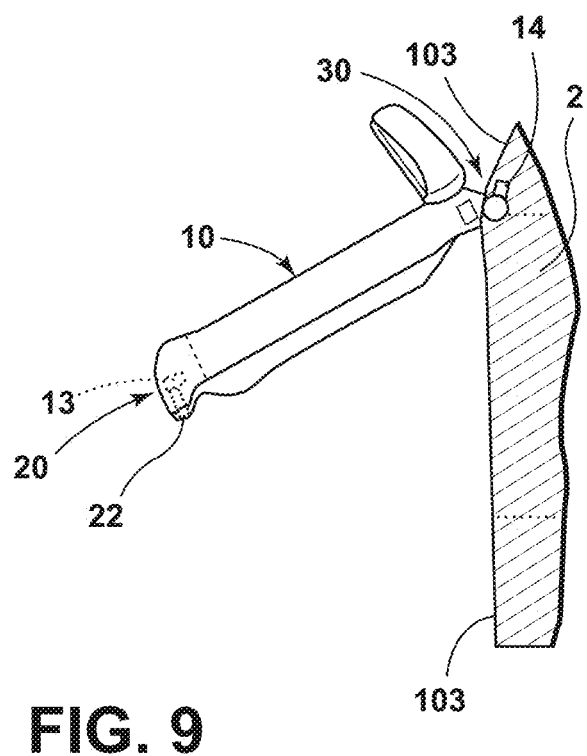
FIG. 9

PRIORITY DRIVEN POWER SIDE DOOR OPEN/CLOSE OPERATIONS

The present application is a Continuation of U.S. patent application Ser. No. 15/227,672 filed on Aug. 3, 2016, now U.S. Pat. No. 10,227,810, entitled "PRIORITY DRIVEN POWER SIDE DOOR OPEN/CLOSE OPERATIONS," which is hereby incorporated herein by reference.

FIELD OF THE INVENTION

Background of the Invention

Electrically powered latches ("E-latches") have been developed for motor vehicles. Known powered door latches may be unlocked, then unlatched by actuating an electrical switch. Actuation of the switch causes an electric motor to shift a pawl to a released/unlatched position that allows a claw of the latch to move and disengage from a striker to permit opening of the vehicle door. Vehicle doors may also include powered actuators that open and/or close the vehicle doors, windows, and provide other powered functions associated with the doors.

SUMMARY OF THE INVENTION

One aspect of the present disclosure is a vehicle door system including a door structure that is movable between a closed position and a fully open position. The door may also include a frameless door glass system having a first electrically-powered actuator that can be actuated to move a glass window between open and closed positions. The door may also include a powered latch including a second electrically-powered actuator that can be actuated to unlatch the powered latch. The door may also include a powered door presenter having a third electrically-powered actuator that can be actuated to extend a push member to shift the door structure from the closed position to a partially open position that is between the closed position and the fully open position. The door may further include a powered door opening mechanism having a fourth electrically-powered actuator that can be actuated to shift the door structure to a fully open position from the partially open position. The door may also include a powered door protector including a protective member that is movably mounted to the door structure. The powered door protector includes a fifth electrically-powered actuator that can be actuated to shift the protective member from a retracted position to a deployed position relative to the door structure upon opening the door structure to thereby protect at least a portion of the door. The vehicle door system may also include a controller that is operably connected to the first, second, third, fourth, and fifth electrically-powered actuators. The controller is configured to actuate the first electrically-powered actuator to shift the glass window away from the closed position if a door release request is received by the controller. The controller is also configured to actuate the second electrically-powered actuator to unlatch the powered latch. The controller is also configured to actuate the third electrically-powered actuator to shift the door structure from the closed position to the partially open position after actuating the first and second electrically-powered actuators. The controller is also configured to actuate the fourth electrically-powered actuator (typically after actuating the third electrically-powered actuator) to thereby shift the door structure from the partially open position to the fully open position. The controller is also configured to actuate the fifth electrically-powered actuator (typically after actuating the third electrically-powered actuator) to thereby shift the protective member from the retracted position to the deployed position. The vehicle door may include a powered door cinching mechanism including a sixth electrically-powered actuator that can be actuated to shift the door structure to a fully closed position from a partially closed position that is between the closed position and the fully open position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a partially fragmentary top plan view of a vehicle door in a closed position;

FIG. 8 is a partially fragmentary top plan view of a vehicle door in a partially open (first check) position;

FIG. 9 is a partially fragmentary top plan view of a vehicle door in a fully opened position;

DETAILED DESCRIPTION OF THE PREFERRED EMBODIMENTS

Figure 1:
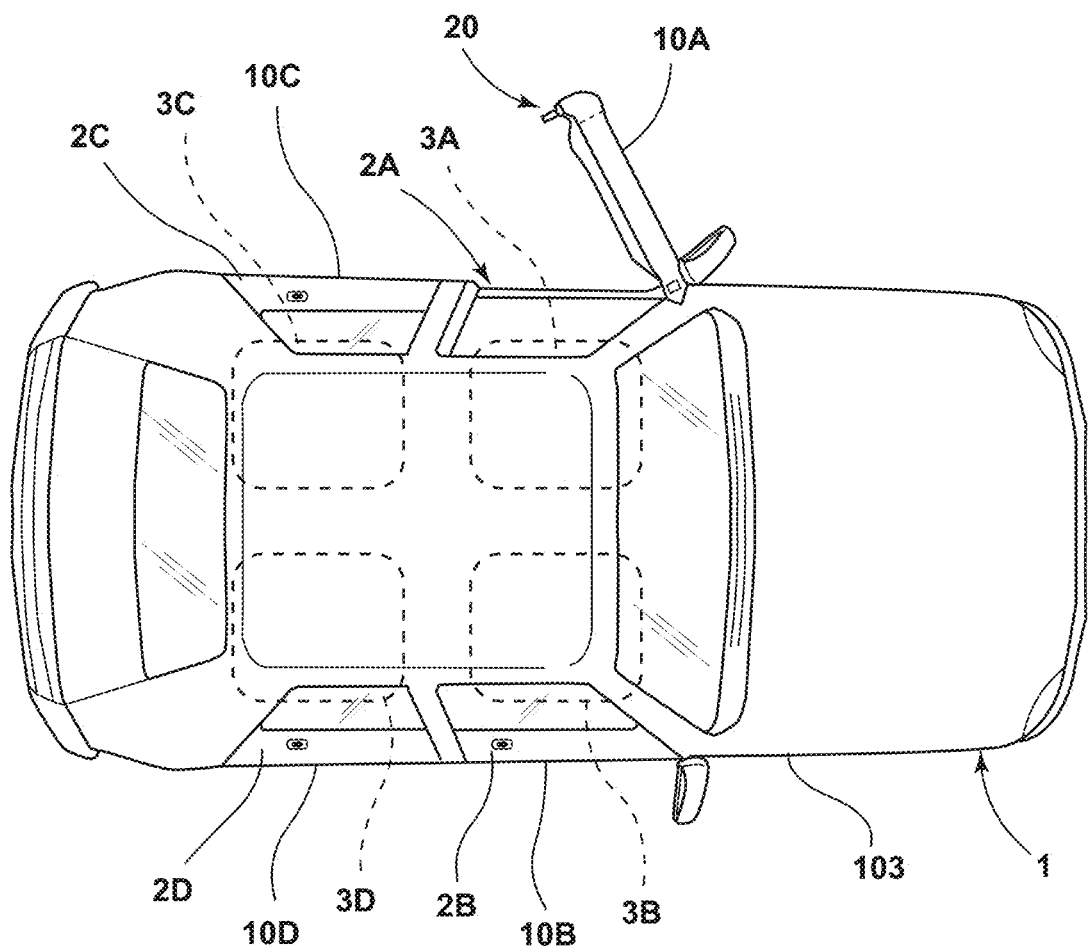
FIG. 1 is a top plan view of a vehicle including a controller that is configured to operate various powered door features.

For purposes of description herein, the terms "upper," "lower," "right," "left," "rear," "front," "vertical," "horizontal," and derivatives thereof shall relate to the disclosure as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to U.S. patent application Ser. No. 14/696,749, filed on Apr. 27, 2015, entitled "ELECTRONIC SAFE DOOR UNLATCHING OPERATIONS," now U.S. Pat. No. 10,323,442, which issued on Jun. 18, 2019, the entire contents of which is incorporated by reference.

Figure 2:
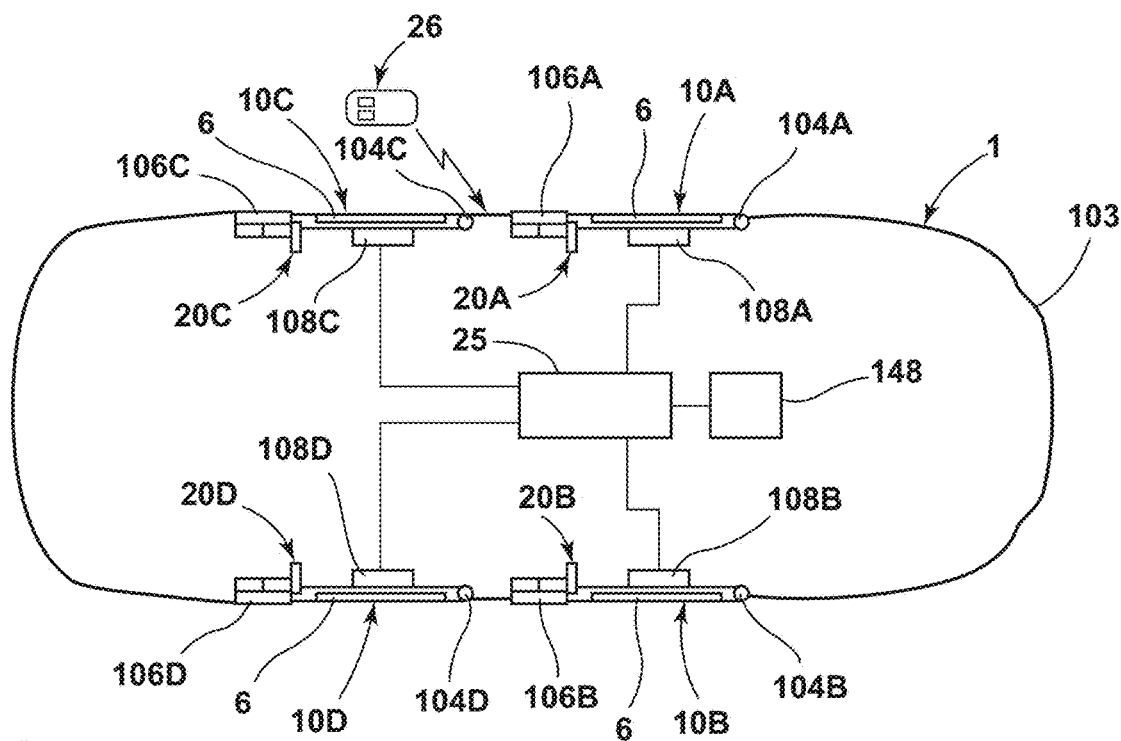
FIG. 2 is a schematic top plan view of the vehicle of FIG. 1.

With reference to FIGS. 1 and 2, a vehicle 1 may include a main vehicle structure 103 including one or more door openings 2A-2D that may be closed off by doors 10A-10D. In the illustrated example, the vehicle 1 includes four doors 10A-10D, each of which may include a controller 116A-116D as discussed in more detail below in connection with FIG. 6. However, it will be understood that the present invention is not limited to a specific number of doors. As used herein, the reference character "10" is used to generally refer to any one of vehicle doors 10A-10D. The doors 10A-10D are movably mounted to the vehicle structure 103 by hinges 104A-104D. The doors 10A-10D may move between a fully closed position (FIG. 7) and a fully open position (FIG. 9). The doors 10A-10D may also move to a partially open position (FIG. 8) that is between the fully closed and fully opened positions of FIGS. 7 and 9, respectively.

Figure 3:
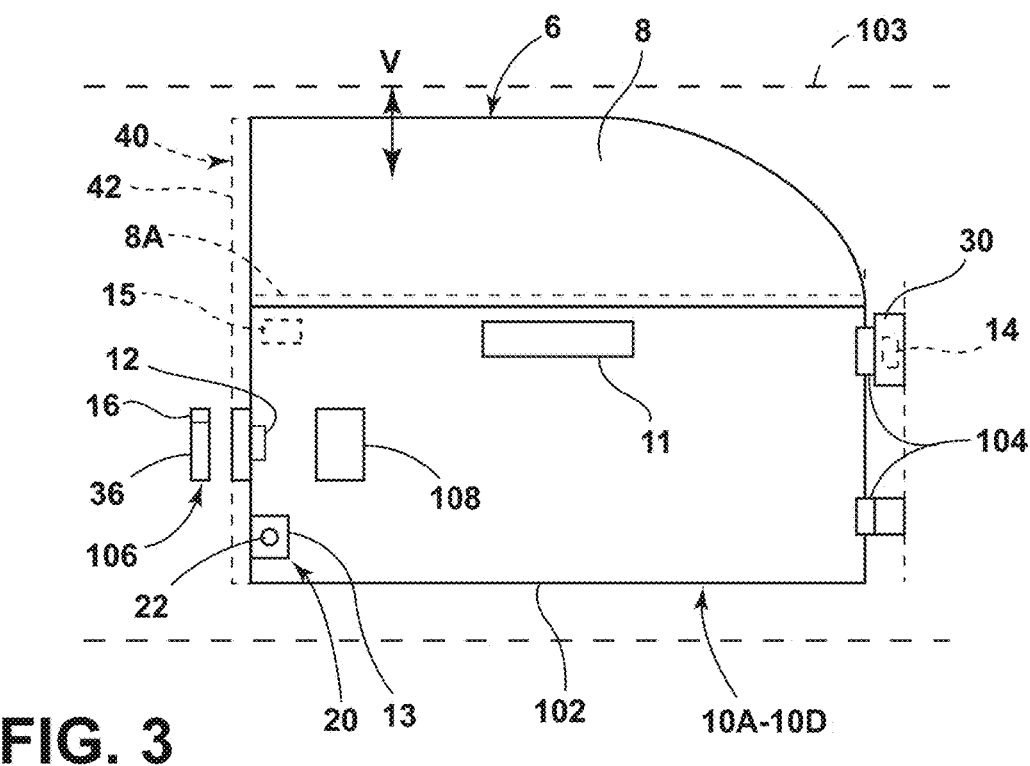
FIG. 3 is a schematic side elevational view of the vehicle of FIG. 2.

The doors 2A-2D may each include a frameless door glass system 6 (see also FIG. 3) including a first electrically-powered actuator such as electric motor 11 that moves a glass window 8 vertically as shown by the arrow "V" between a lowered open position 8A and a raised closed position. An example of a frameless door glass system is disclosed in U.S. Patent Publication No. 2014/0041302, the entire contents of which are hereby incorporated by reference. In general, the frameless door glass system 6 partially opens ("drops") window glass 8 prior to opening or closing the vehicle door 10 to eliminate or reduce interference between window glass 8 and seals (not shown) on vehicle structure 103 to facilitate opening and closing of the door 10.

Figure 4:
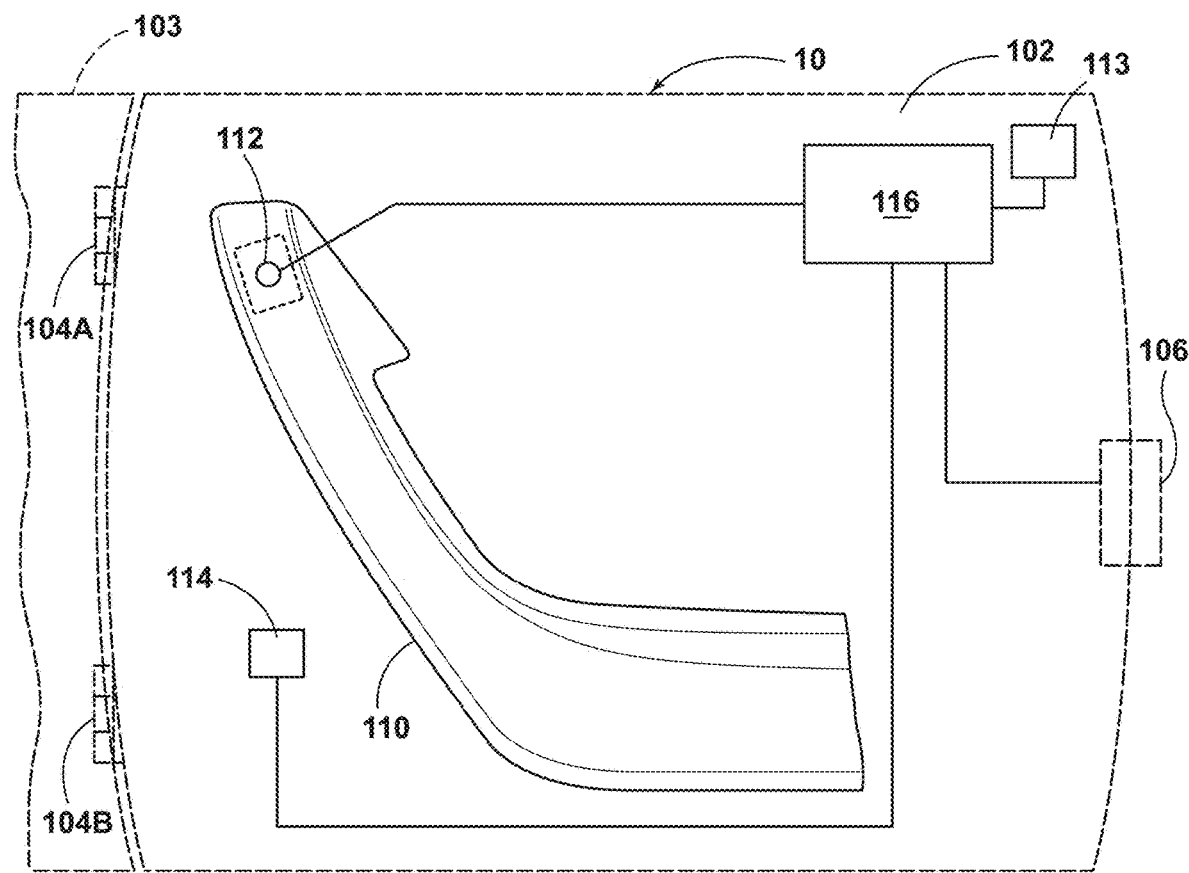
FIG. 4 is a partially schematic view of an interior side of a vehicle door having a powered latch.

As discussed in more detail below in connection with FIGS. 4-6, each door 10A-10D may include a powered latch ("eLatch"), 106 having a second electrically-powered actuator 12 that can be actuated to unlatch the powered latch 106. The second electrically-powered actuator 12 of FIG. 3 may correspond to the electric motor 192 of FIG. 5.

The door system may also include a powered door presenter mechanism 20. As discussed in more detail below in connection with FIGS. 7-11, the powered door presenter 20 includes a third electrically-powered actuator 13 that can be actuated to extend a push member 22 to shift the door 10 from a closed position (FIG. 7) to a partially open position (FIG. 8) that is between the closed position of FIG. 7 and the fully open position of FIG. 9.

As discussed in more detail below in connection with FIGS. 7-9 and FIG. 12, the door 10 may also include a powered door opening mechanism 30 having a fourth electrically-powered actuator such as an electric motor 14 that can be actuated to shift the door 10 to a fully open position (FIG. 9) from the partially open position (FIG. 8).

The door system may also include a powered door protector 40 including a protective member 42 that is movably mounted to the door structure 102. The powered door protector 40 includes a fifth electrically-powered actuator such as an electric motor 15 that can be actuated to shift the protective member 42 from a retracted position to a deployed position relative to the door structure 102. An example of a door edge protective device is disclosed in U.S. Pat. No. 8,303,021, the entire contents of which are incorporated by reference. Also, commercially available motor vehicles such as 2012 and later model year Ford® Focus® automobiles available in Europe may include covered door edge protectors. However, it will be understood that the powered door protector 40 is not limited to door edge protection. Rather, the powered door protector 40 fully prevents door dings and dents, not just damage to the edge of the door. Furthermore, the powered door protector 40 ensures the widest possible opening of door 10 under all circumstances. The powered door protector 40 also prevents opening door 10 into an oncoming bicycle, child, or pedestrian.

Referring again to FIG. 2, each door 10 may include a controller 116 that is operably connected to a vehicle control system 25. As discussed in more detail below in connection with FIG. 6, the vehicle control system 25 may include one or more control modules such as a body control module (BCM) 140 and/or other individual control modules. The individual controllers 116A-116D and/or main vehicle control system 25 are configured to actuate the first electrically-powered actuator/motor 11 to shift the glass window 8 away from the closed position if a door release request is received by the controller.

As also discussed below, a door release request may be generated by one or more unlatch sensors positioned on the interior or exterior of doors 10. Alternatively, an unlatch request may be generated by a wireless device 26. The wireless device 26 may comprise a conventional "fob" or it may comprise a smart phone that is configured to wirelessly communicate with controllers 116A-116D and/or main vehicle control system 25 as described in U.S. Pat. No. 9,845,071, issued on Dec. 19, 2017, entitled "KEYLESS CAR SHARING MECHANISM USING SMARTPHONES AND INBUILT WIFI SYSTEMS FOR AUTHENTICATION," and U.S. patent application Ser. No. 15/174,592, filed on Jun. 6, 2016, entitled "KEYLESS VEHICLE SYSTEM THAT ENABLES SERVICING," the entire contents of which are incorporated by reference. As discussed below in connection with FIG. 4, each door 10 may include an interior unlatch switch 112, an interior unlock switch 114, and an exterior unlatch switch 113.

The controller 116 and/or 25 are also configured to actuate the second electrically-powered actuator 12 to unlatch the powered latch 106. The controllers 116 and/or 25 are also configured to actuate the third electrically-powered actuator/motor 13 to shift the door 10 from the closed position (FIG. 7) to the partially open position (FIG. 8) after actuating the first and second electrically-powered actuators/motors 11 and 12, respectively. The controllers 116 and/or 25 are also configured to actuate the fourth electrically-powered actuator/motor 14 after actuating the third electrically-powered actuator/motor 13 to thereby shift the door 10 from the partially open position (FIG. 8) to the fully open position (FIG. 9). The controllers 116 and/or 25 are also configured to actuate the fifth electrically-powered actuator/motor 15 after actuating the third electrically-powered actuator/motor 13. Actuating the fifth electrically-powered actuator/motor 15 shifts the protective member 42 from the retracted position to the deployed position.

As discussed in U.S. patent application Ser. No. 14/696,749, a door 10 (FIG. 1) includes a door structure 102 that may be movably mounted to a vehicle structure 103 in a known manner utilizing hinges 104A and 104B Door 10 may also include an electrically powered latch that is configured to selectively retain the door 10 in a closed position. The powered latch 106 is operably connected to a controller 116. The controller 116 may comprise an individual control module that is part of the powered latch 106, and the vehicle may include a powered latch 106 at each of the doors of vehicle 1. Door 10 may also include an interior unlatch input feature such as an interior unlatch switch 112 that is operably connected to the controller 116, and an exterior unlatch switch 113 that is also operably connected to controller 116. Interior unlatch switch 112 is disposed on an interior side of door 10 where it is accessible from inside the vehicle, and exterior unlatch switch 113 is disposed on an exterior side of door 10 and is accessible from the outside of the vehicle 1 when door 10 is closed.

In use, a user actuates the interior unlatch switch 112 or exterior unlatch switch 113 to generate an unlatch request to the controller 8. If the latch 106 is unlatched and/or certain predefined operating perimeters or conditions are present, controller 116 generates a signal causing powered latch 106 to unlatch upon actuation of interior unlatch switch 112. Door 10 may also include an unlock input feature such as an unlock switch 114 that is mounted to an inner side of the door 10. The unlock switch 114 is operably connected to the controller 116. Controller 116 may be configured to store a door or latch lock or unlock state that can be changed by actuation of unlock switch 114. Controller 116 may be configured (e.g. programmed) to deny an unlatch request generated by actuation of the interior unlatch switch 112 or exterior unlatch switch 113 if the controller 116 determines that the powered latch 106 is in a locked state. Controller 116 is preferably a programmable controller that can be configured to unlatch powered latch 106 according to predefined operating logic by programming controller 116. However, controller 116 may comprise electrical circuits and components that are configured to provide the desired operating logic. As used herein, the term "controller" may refer to one or more processors, circuits, electronic devices, and other such components and systems that are arranged to provide the desired control.

Figure 5:
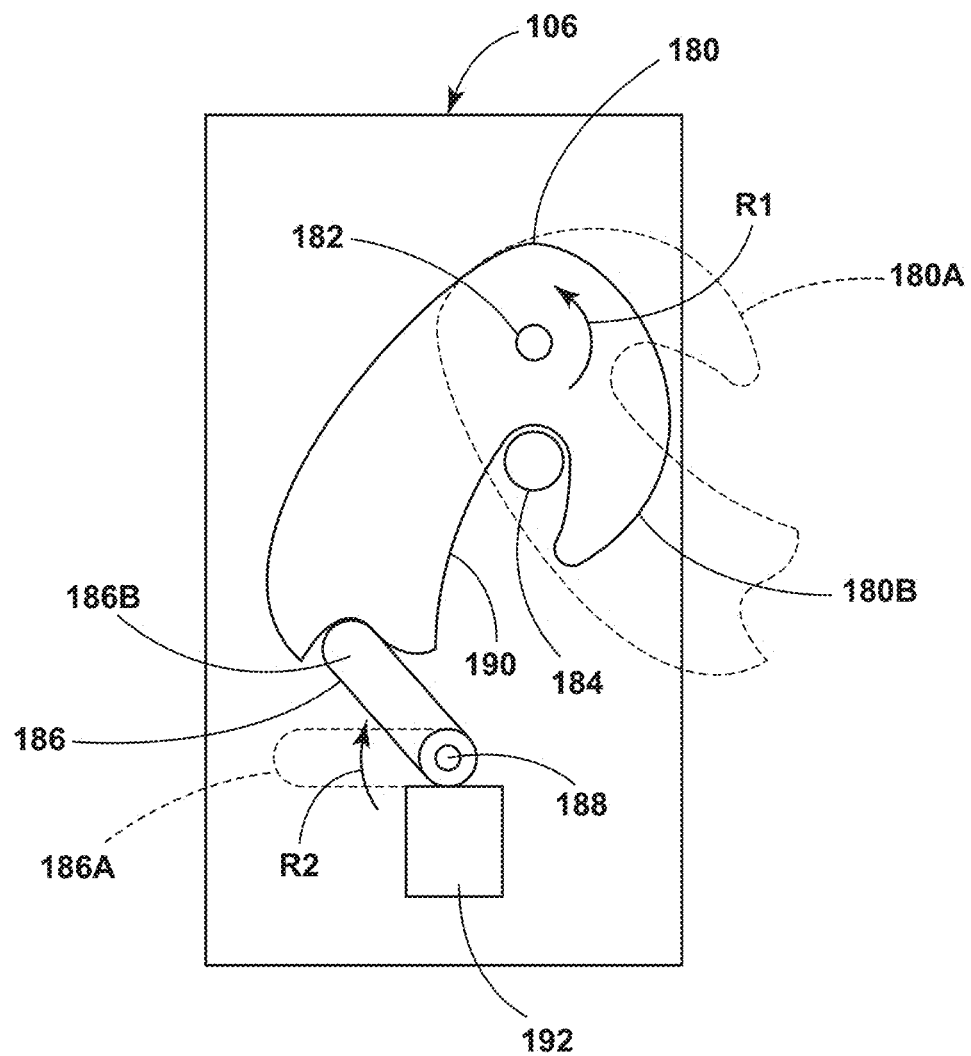
FIG. 5 is a schematic view of a powered latch.

With further reference to FIG. 5, powered latch 106 may include a movable retaining (latch) member such as claw 180 that pivots about a pivot 182 and a pawl 186 that is rotatably mounted for rotation about a pivot 188. Pawl 186 can move between a disengaged or unlatched position 186A and a latched or engaged configuration or position 186B. In use, when door 10 is open, claw 180 will typically be in an extended position 180A. As the door 10 is closed, surface 190 of claw 180 comes into contact with a striker 184 that is mounted to the vehicle structure. Contact between striker 184 and surface 190 of claw 180 causes the claw 180 to rotate about pivot 182 in the direction of the arrow "R1" until the claw 180 reaches the closed position 180B. When claw 180 is in the closed position 180B, and pawl 186 is in the engaged position 186B, pawl 186 prevents rotation of claw 180 to the open position 180A, thereby preventing opening of door 10. Claw 180 may be biased by a spring or the like (not shown) for rotation in a direction opposite the arrow R1 such that the claw 180 rotates to the open position 180A unless pawl 186 is in the engaged position 186B. Pawl 186 may be biased by a spring or the like (not shown) in the direction of the arrow R2 such that pawl 186 rotates to the engaged position 186B as claw 180 rotates to the closed position 180B as striker 184 engages claw 180 as door 10 is closed. Latch 106 can be unlatched by rotating pawl 186 in a direction opposite the arrow R2 to thereby permit rotation of claw 180 from the closed position 180B to the open position 180A.

A powered actuator such as an electric motor 192 may be operably connected to the pawl 186 to thereby rotate the pawl 186 to the disengaged or unlatched position 186A. Controller 116 can unlatch powered latch 106 to an unlatched configuration or state by causing powered actuator 192 to rotate pawl 186 from the latched or engaged position 186B to the unlatched configuration or position 186A. However, it will be understood that various types of powered latches may be utilized in the present invention, and the powered latch 106 need not include the claw 180 and powered pawl 186 as shown in FIG. 5. For example, powered actuator 192 could be operably interconnected with the claw 180 utilizing a mechanical device other than pawl 186 to thereby shift the powered latch 106 between latched and unlatched states. In general, vehicle door 10 can be pulled open if powered latch 106 is in an unlatched state, but the powered latch 106 retains the vehicle door 10 in a closed position when the powered latch 106 is in a latched state or configuration.

Figure 6:
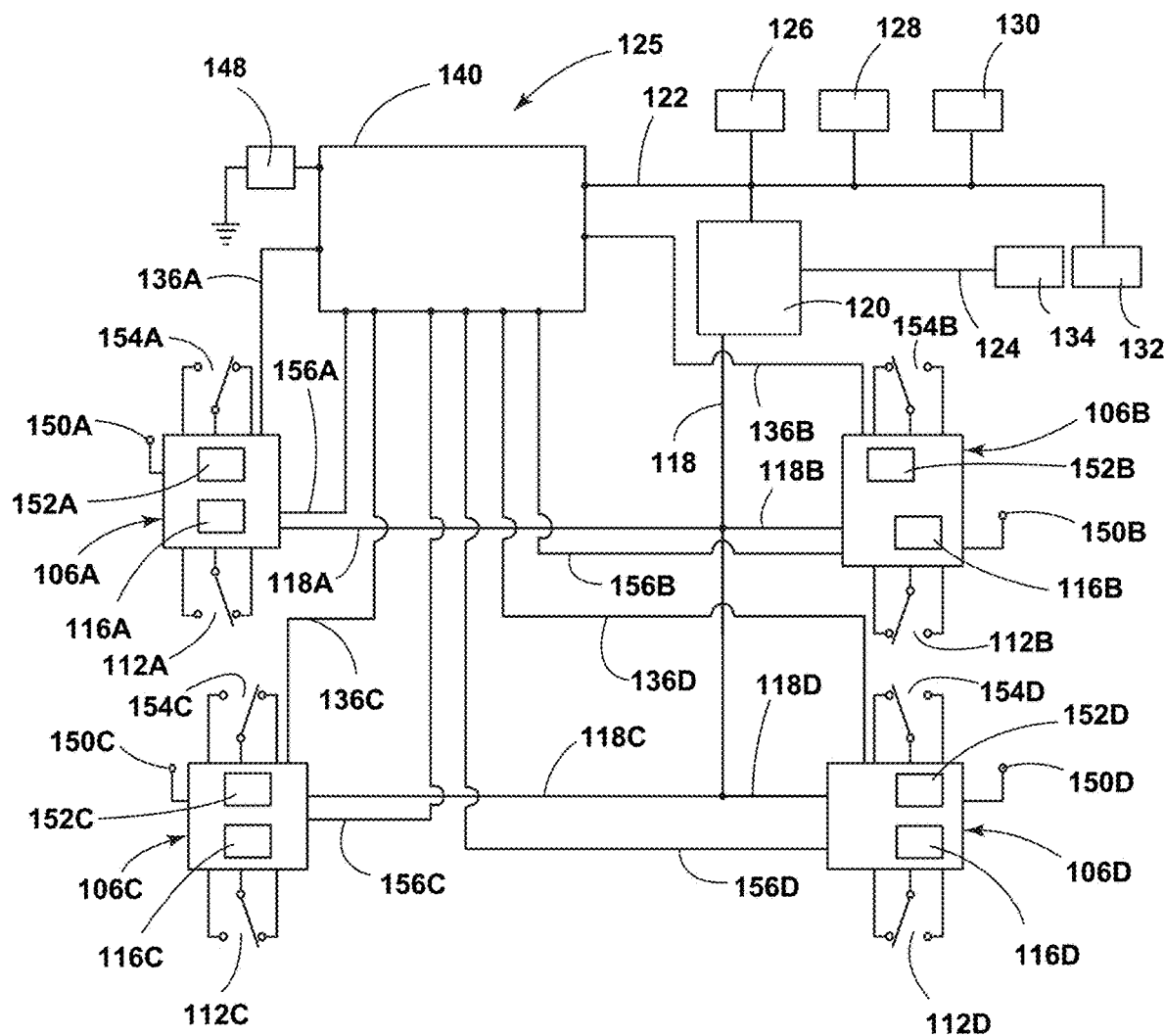
FIG. 6 is a diagram showing a powered latch system.
Figure 10:
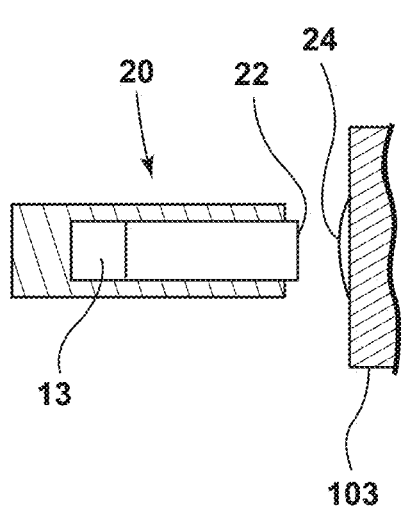
FIG. 10 is a partially schematic cross sectional view of a powered door presenter mechanism showing a plunger in a retracted position.

With further reference to FIG. 6, a latch system 125 may include a driver's side front powered latch 106A, a passenger side front powered latch 106B, a driver's side rear powered latch 106C and a rear passenger side powered latch 106D. The powered latches 106A-106D are configured to selectively retain the corresponding driver and passenger front and rear doors of a vehicle in a closed position. Each of the powered latches 106A-106D may include a controller 116A-116D, respectively, that is connected to a medium speed data network 118 including network lines 118A-118D. Controllers 116A-116D are preferably programmable controllers, but may comprise electrical circuits that are configured to provide the desired operating logic. The data network 118 may comprise a Medium Speed Controller Area Network ("MS-CAN") that operates according to known industry standards. Data network 118 provides data communication between the controllers 116A-116D and a digital logic controller ("DLC") gateway 120. The DLC gateway 120 is operably connected to a first data network 122, and a second data network 124. First data network 122 may comprise a first High Speed Controller Area Network ("HS1-CAN"), and the second data network 124 may comprise a second High Speed Controller Area Network ("HS2-CAN"). The data networks 122 and 124 may operate according to known industry standards. The first data network 122 is connected to an Instrument Panel Cluster ("IPC") 126, a Restraints Control Module ("RCM") 128, and a Powertrain Control Module ("PCM") 130. The RCM 128 utilizes data from acceleration sensors to determine if a crash event has occurred. The RCM 128 may be configured to deploy passenger restraints and/or turn off a vehicle's fuel supply in the vent a crash is detected. RCM 128 may be configured to generate an Emergency Notification System ("ENS") signal if a crash occurs. The ENS signal may be transmitted over one or both of the data networks 122 and 124 (preferably both). The RCM is also preferably connected ("hard wired") directly to each powered latch 106A-106D by wires (not shown) such that powered latches 106A-106D receive an ENS signal even if data networks 122 and 124 are not operational. The first high speed data network 122 may also be connected to a display screen 132 that may be positioned in a vehicle interior to provide visual displays to vehicle occupants. The second high speed data network 124 is operably connected to antilock brakes ("ABS") module 134 that includes sensors that measure a speed of the vehicle.

System 125 also includes a Body Control module ("BCM") 140 that is connected to the first high speed data network 122. The body control module 140 is also operably connected to the powered latches 106A-106D by data lines 136A-136D. Controllers 116A-116D may also be directly connected ("hardwired") to control module 140 by electrical conductors such as wires 156A-156D, respectively. Wires 156A-156D may provide a redundant data connection between controllers 116A-116D and controller 140, or the wires 156A-156D may comprise the only data connection between controllers 116A-116D and controller 140. Control module 140 may also be operably interconnected to sensors (not shown) that signal the control module 140 if the vehicle doors are ajar. Control module 140 is also connected to a main vehicle electrical power supply such as a battery 148. Each of the powered latches 106A-106D may be connected to main vehicle power supply 148 by connector's 150A-150D. The powered latches 106A-106D may also include back up power supplies 152 that can be utilized to actuate the powered actuator 192 in the event the power supply from main vehicle power supply ("VPWR") 148 is interrupted or lost. The backup power supplies 152A-152D may comprise capacitors, batteries, or other electrical energy storage devices. In general, the backup power supplies 152A-152D store enough electrical energy to provide for temporary operation of controllers 116A-116D, and to actuate the powered actuators 192 a plurality of times to permit unlatching of the vehicle doors in the event the main power supply/battery 148 fails or is disconnected.

Each of the powered latches 106A-106D is also operably connected to a two pole (for example, both poles normally opened or one pole normally opened and one pole normally closed) interior unlatch switch 112A-112D, respectively, that provide user inputs (unlatch requests). The powered latches 106A-106D are also operably connected to an exterior unlatch switches 154A-154D, respectively. Controllers 116A-116D are also operably connected to unlock switches 114 (FIG. 4). Controllers 116A-116D may be configured to store the Lock Status ("Locked" or "Unlocked") and to utilize the Lock Status for control of powered latches 106A-106.

Figure 11:
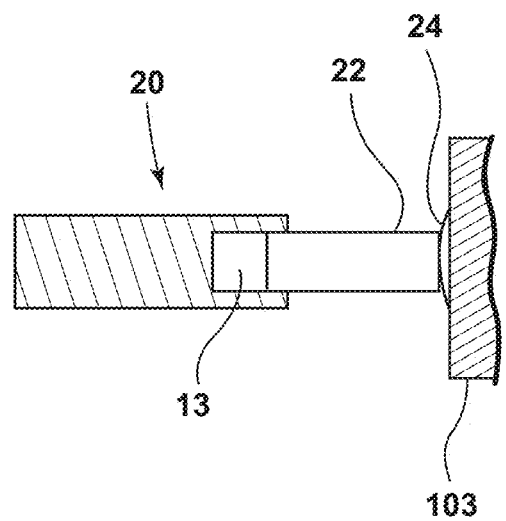
FIG. 11 is a partially schematic cross sectional view of a powered door presenter mechanism showing a plunge in an extended position.

Referring to FIGS. 7-9 and 10-11, powered door presenter 20 includes third electrically-powered actuator 13 which shifts push member 22 from a retracted position (FIG. 10) to an extended position (FIG. 11). In general, the push member engages a surface 24 of vehicle structure 103 to shift door 10 from the closed position (FIG. 7) to the partially open position (FIG. 8). The electrically-powered actuator 13 may comprise a solenoid, electric motor, or the like that is operably connected to push member 22 via a gear drive system (not shown). Powered door presenter 20 may include sensors (not shown) that provide a signal to controller 116 concerning the position of plunger 22. After the vehicle door 10 is opened (FIG. 9), the third electrically-powered actuator 13 may be retracted to permit the door 10 to return to the closed position.

With reference to FIG. 7-9, the powered door opening mechanism 30 may be actuated to shift the door from the partially open position (FIG. 8) to the fully open position (FIG. 9). The powered door opening mechanism 13 may also be actuated to shift the door 10 from the open position (FIG. 9) to the fully closed position (FIG. 7). Door 10 may include a powered cinch mechanism 36 (FIG. 3) having a sixth electrically-powered actuator such as electric motor 16 that pulls door 10 to a fully closed position. The powered door opening mechanism 30 may include an electrically-powered actuator such as an electric motor 14 or the like that drives gears (not shown) that engage teeth of rack 32 of a strap 34 to thereby open and close the door 10. The powered door opening mechanism 30 may be configured to provide a plurality of check (detent) positions such that the door 10 can be stopped at one or more of the check positions. In general, the check positions are predefined positions of door 10 that are between the fully closed position (FIG. 7) and the fully opened position (FIG. 9). Door 10 will tend to remain at a check position, but door 10 can be moved from a check position if a sufficient force is applied to door 10. Vehicle 1 may include one or more sensors (e.g. capacitive sensors) that are configured to determine if an object is in the path of door 10 prior to opening door 10. Similarly, capacitive sensors, pinch strips, or the like (not shown) may be positioned on door 10 or on vehicle 1 adjacent the door openings 2 to thereby generate a signal if a user is obstructing the path of the door 10 in a manner that would otherwise interfere with closing of door 10. As discussed in more detail below in connection with FIGS. 13A-13D, the system is configured to control opening and closing of door 10 based on whether or not an object is detected in the path of door 10 prior to opening or closing of door 10.

Figure 12:
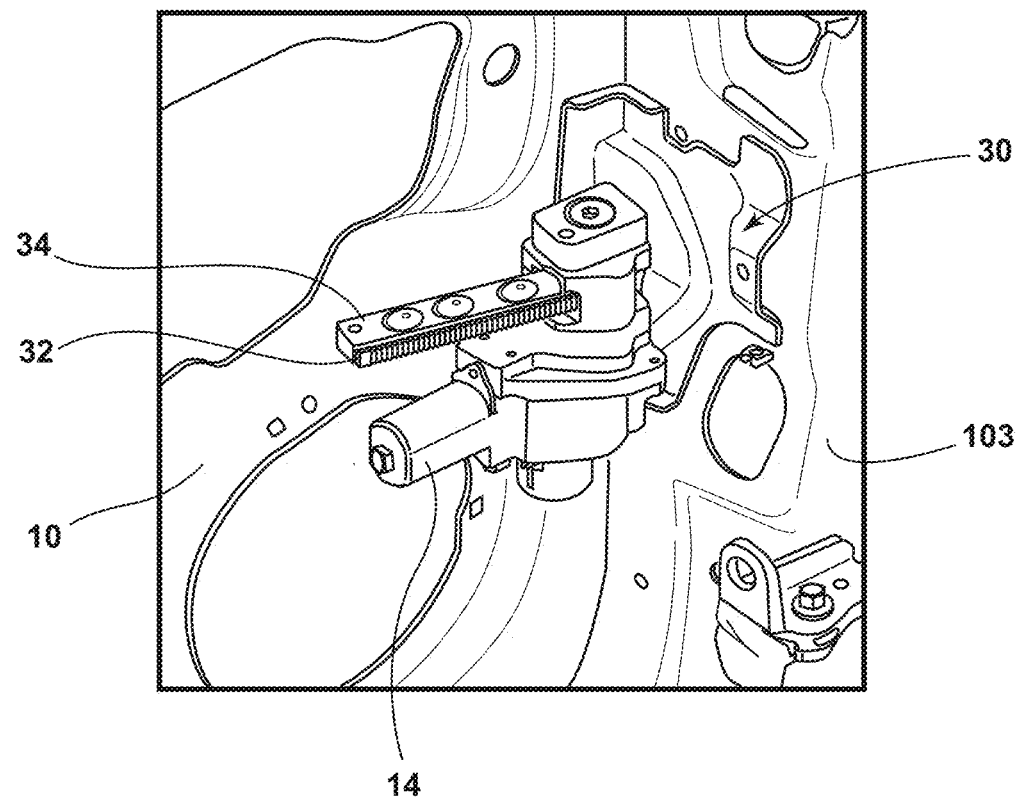
FIG. 12 is a partially fragmentary isometric view of a powered door check mechanism.
Figure 12A:
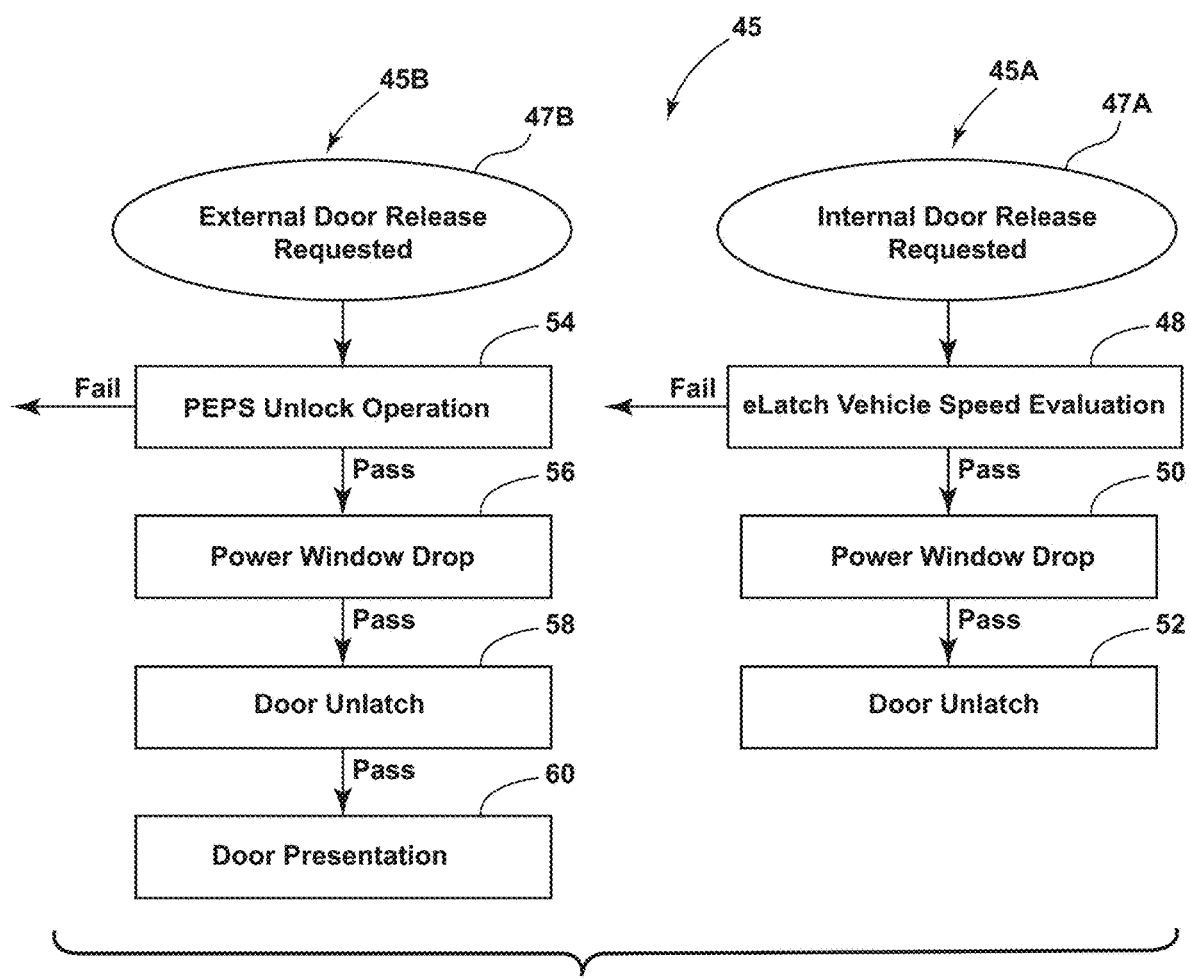
FIG. 12A is a flow chart showing external and internal door release operations.

A door opening control scheme or logic 45 is shown schematically in FIG. 12A. An internal door release process 45A is initiated when an internal door release 47A is requested. The internal door release request may be initiated by actuated of interior unlatch switch 112 (FIG. 4). At step 48 the vehicle speed is evaluated. If the vehicle speed exceeds a predefined maximum speed (e.g. 3 kph), the latch 106 is not unlatched. Step 48 may include evaluation of a sensor input from a seat 3A-3D (FIG. 1) of vehicle 1. Seats 3A-3D may include a sensor that determines a weight of an occupant. A predefined weight limit (e.g. 50 lbs.) may be utilized as a criteria in processing internal door release request 47A in connection with the vehicle speed evaluation (step 48). More specifically, if a sensor signal indicates that a light weight occupant (e.g. a child under a specific predefined weight limit) is present, the system may require a double unlatch request (i.e. two actuations of interior unlock switch 112) within a predefined time period (e.g. 3 seconds) to unlatch the powered latch 106, and also not permit door opening at a speed above 3 kph if a light weight occupant is detected. However, if a heavy weight occupant is detected (i.e. an occupant is above the predefined weight limit), the system may be configured to unlatch the door 10 by actuating powered latch 106 upon a signal actuation of interior switch 112 when the vehicle speed is under 3 kph, and require a double unlatch signal (i.e. two actuations of switch 112) to unlatch four speeds above 3 kph. The predefined weight limit may be, for example, 40 lbs., 50 lbs., 60 lbs., 80 lbs., etc.

If the speed evaluation (step 48) is a "Fail," no action is taken, and the powered latch 106 remains latched. However, if the evaluation at step 48 results in a "Pass," the controller actuates the first electrically-powered actuator/motor 11 to at least partially drop the window glass 8, and the controller 116 then provides a powered unlatch of powered latch 106 as shown at step 52. In general, the power window drop of step 50 occurs prior to the door unlatch of step 52 to provide for unimpeded opening of the door 10.

Referring again to FIG. 12, an external door release request may be received as shown at step 47B. An external door release request may be generated by external switch 113 (FIG. 4), or the release request may be received from a wireless device 26 (FIG. 2). The external door release request may be processed in a (keyless) passive entry passive start (PEPS) unlock operation as shown at step 54. In general, PEPS operation involves receiving a wireless signal (e.g. security code) from a wireless device 26 which may comprise a fob or smart phone, and the system then determines if an authorized user is in the vicinity of the vehicle 1. If an authorized user is determined to be in the vicinity, a user can position his or her hand on the exterior door handle to activate a switch or trigger a capacitive sensor which results in unlocking of a vehicle door. After unlocking, if the vehicle door includes a powered latch, the powered latch may also unlatch the door without movement of the door handle upon receiving an unlatch request from a sensor or switch. A user can then enter the vehicle and start the vehicle by pressing a button. PEPS systems are generally known in the art, such that the details of PEPS operation will not be described in detail herein.

If the PEPS unlock operation at step 54 fails, the powered latch 106 is not unlatched, and no further action is taken. However, if the PEPS unlock operation 54 results in a "Pass," the controller then causes the powered window to drop at step 56, the door (latch 106) is unlatched at step 58, and the door 10 is shifted to the presented position (FIG. 8) at step 60 due to actuation of powered door presenter 20.

Figure 13A:
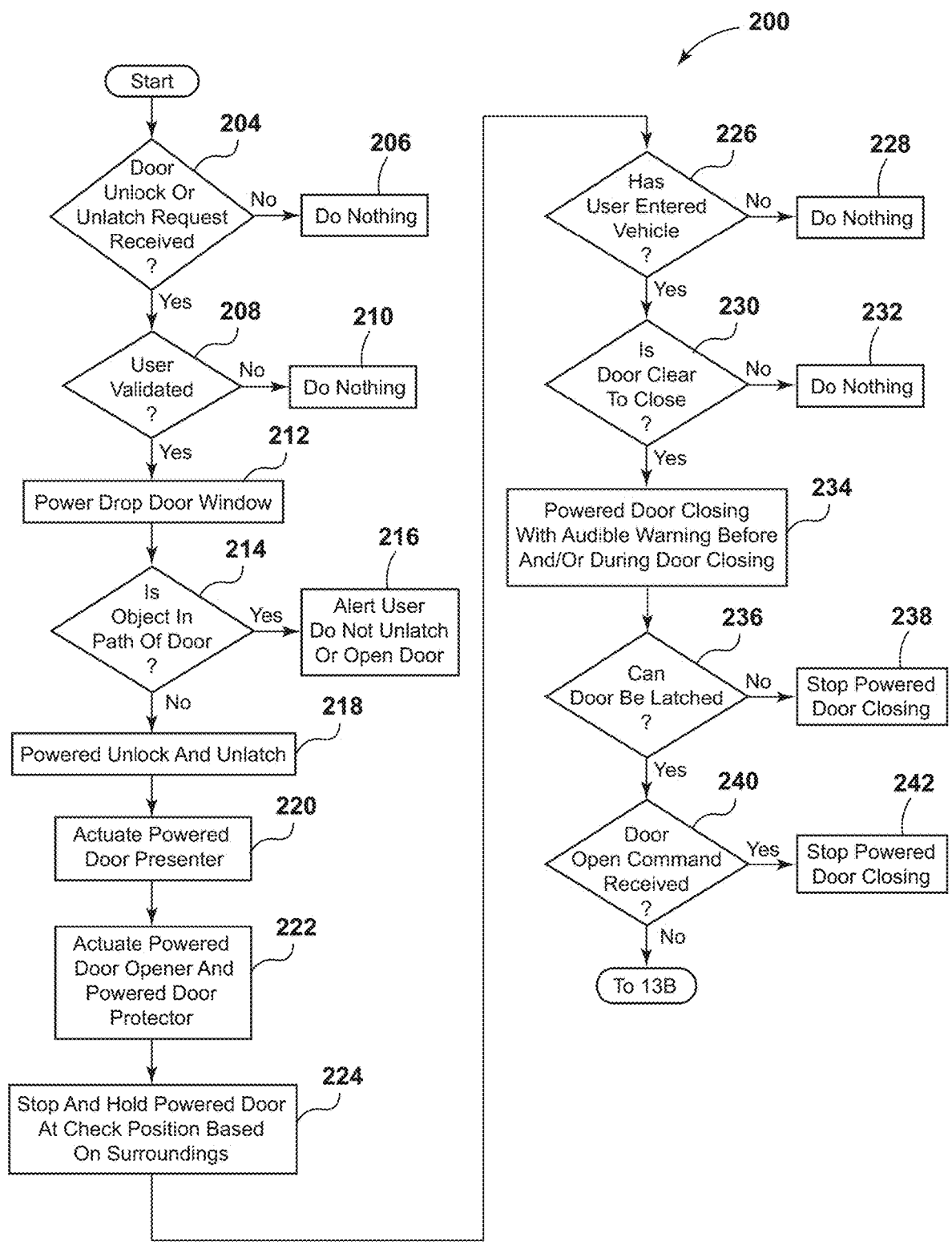
FIG. 13A is a flow chart showing a first portion of the operation of the various door powered functions.
Figure 13B:
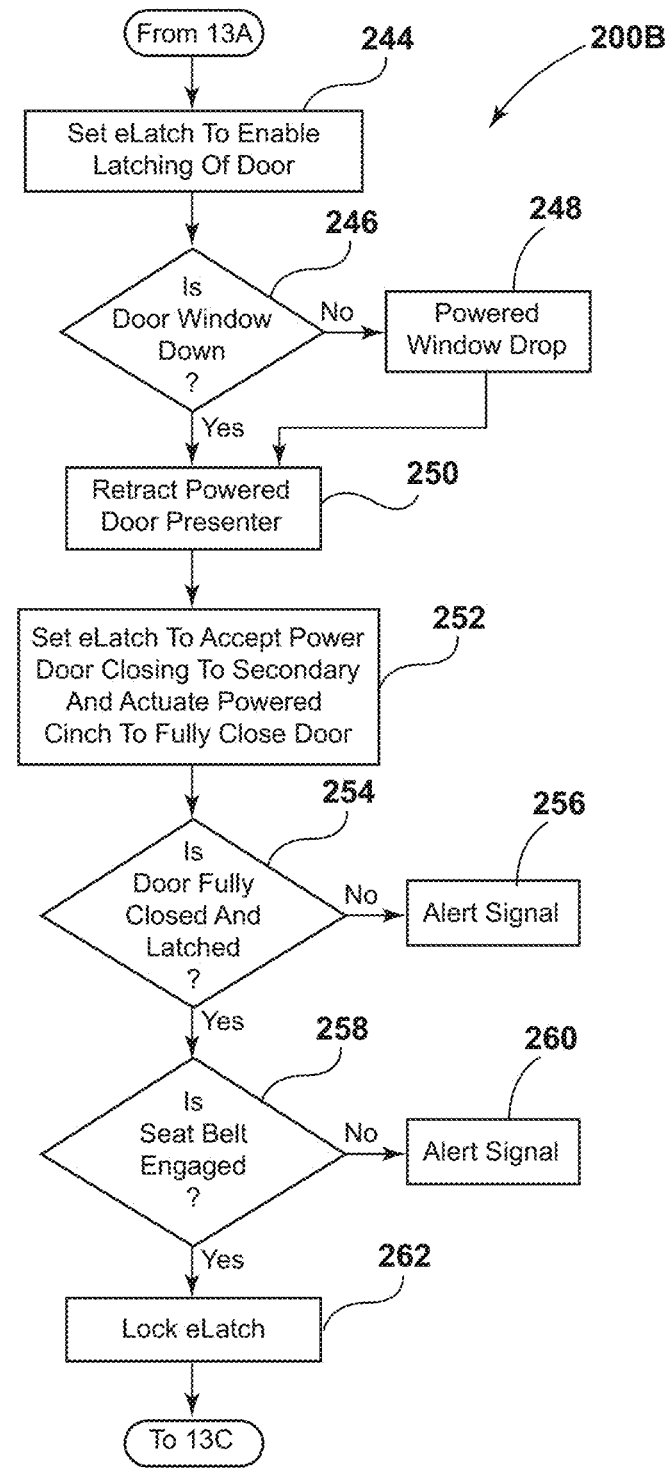
FIG. 13B is a flow chart showing a second portion of the operation of the various door powered functions.
Figure 13C:
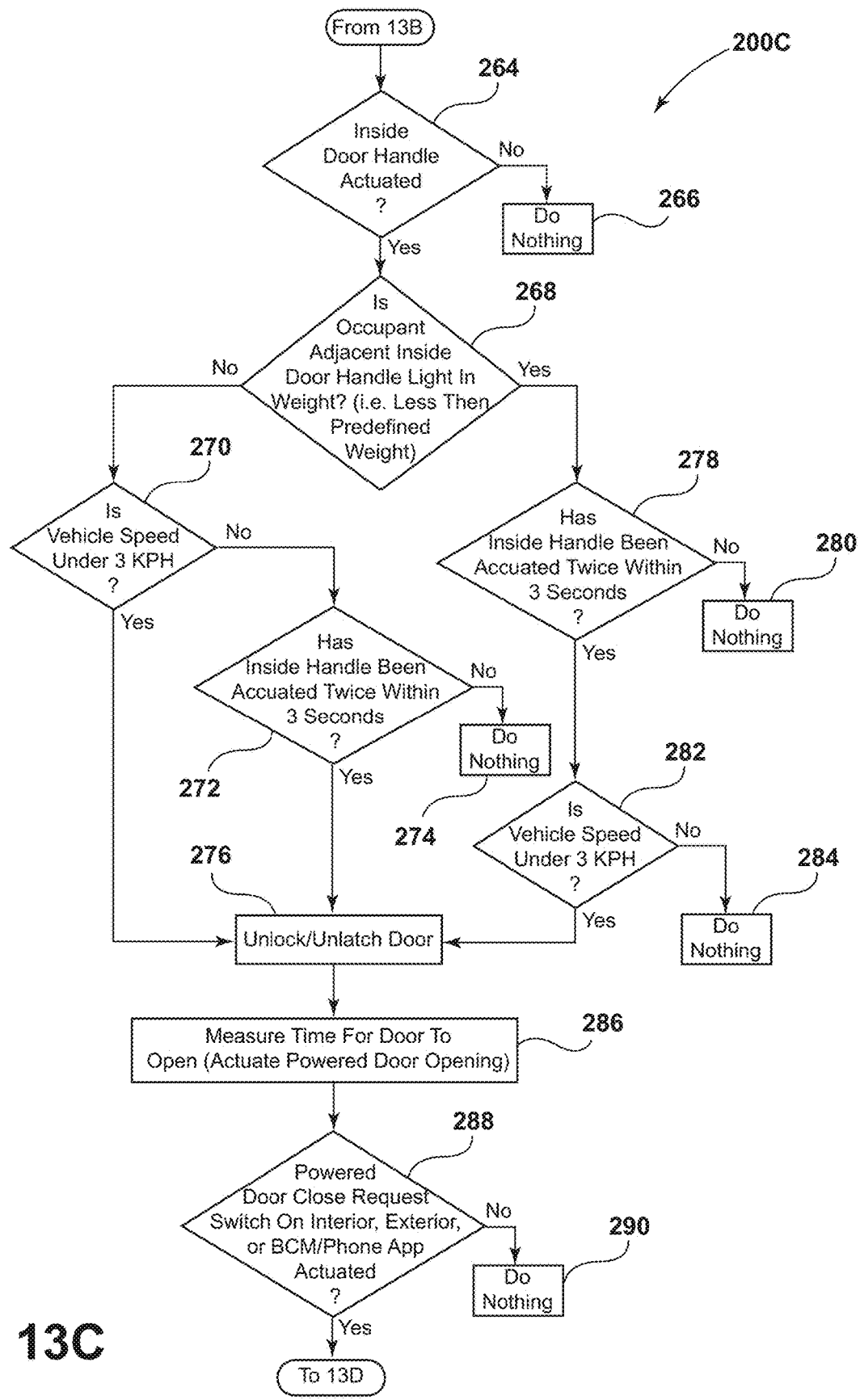
FIG. 13C is a flow chart showing a third portion of the operation of the various door powered functions.
Figure 13D:
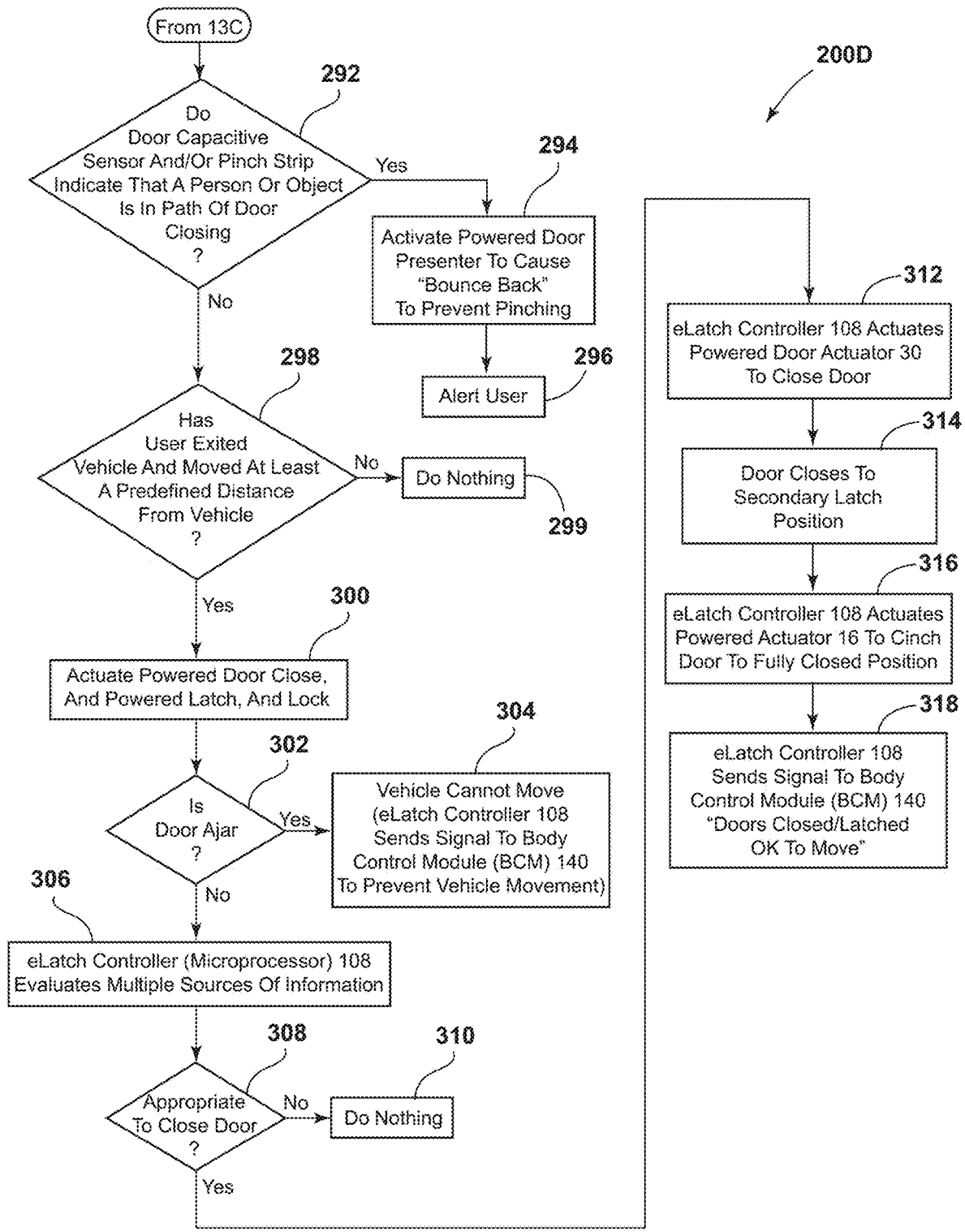
FIG. 13D is a flow chart showing a fourth portion of the operation of the various door powered functions.

The operation of the vehicle doors 10A-10D is shown schematically in FIGS. 13A-13D. Specifically, the control logic/priority/process 200 includes a first portion 200A (FIG. 13A), a second portion 200B (FIG. 13B), a third portion 200C (FIG. 13C), and a forth portion 200D (FIG. 13D). The operations of FIGS. 13A-13D may be performed by the individual latch controllers 116A-116D and/or the vehicle control system 25 (e.g. BCM 140). Although the control logic is generally shown as a flow chart in FIGS. 13A-13D, it will be understood that the various door operations do not necessarily occur in the specific sequences shown in FIGS. 13A-13D, and the use of a flow chart is therefore not intended to be limiting, but rather to facilitate explanation of the various operations and the control logic/priority. In general, the various powered door operations are carefully managed and synchronized to permit smooth, seamless operation of the various components, while preventing undesired operating conditions.

Referring to FIG. 13A, following start 202, the system (e.g. one of controllers 116A-116D) first determines if a door unlock or unlatch request has been received at step 204. If no request has been received, the system does nothing as shown at 206. However, if an unlock or unlatch request is received at step 204, the process continues at step 208, and the system determines if the request has been received from a validated user. Validation may involve determining if a specific authorized code or sequence has been transmitted by a wireless device 26 (FIG. 2), or it may involve entry of an authorization code utilizing a keypad or the like (not shown). If the user is not validated, the system does nothing as shown at 210. However, if the user is validated, the windows 8 are dropped at least partially as shown at step 112.

As shown at step 214, the system then evaluates if an object is in the path of the door. As discussed above, each door 10A-10D may include one or more sensors such as capacitive sensors (not shown) that determine if an object is present in the path of the door 10 that would otherwise interfere with opening of the door 10. Sensors of this type are known, such that a detailed description is not provided herein. If an object is in the path of the door, the system generates an alert to the user at step 216. The alert may comprise a signal on an interior display screen, an audio message, or the like. If no object is in the path of the door, the powered latch 106 is unlocked and unlatched as shown at step 218. The powered door presenter 20 is then actuated as shown at step 220, and the powered door opener 30 and powered door protector 40 are then actuated as shown at step 224.

As shown at step 226, the system then determines if a user has entered the vehicle. Vehicle 1 may include one or more sensors that determine if a user has entered the vehicle. Alternatively, if the user is carrying a wireless device 26, the vehicle 1 may be configured to determine if the wireless device 26 is in the vehicle interior. If a user has not entered the vehicle, the system does not take any further action as shown at step 228. However, if a user has entered the vehicle, the system then determines if the door is clear to close at step 230. In general, the vehicle 1 may include capacitive sensors, door edge strip detectors, or the like (not shown) to determine if the door is clear to close at step 230. Sensors of this type are generally known in the art, such that a detailed description is not believed to be required. If the door is not cleared to close, the system does nothing as shown at step 232. However, if the door is cleared to close, the system generates a warning (e.g. audio warning) at step 234 before and/or during the door closing operation as shown at step 234. At step 236, the system determines if the door can be latched. This determination may involve evaluating input from sensors to determine if an object is in the path of the door. If the door cannot be latched, the powered door closing operation is stopped as shown at step 238. If the door can be latched, the system then determines if a door open command has been received at step 240. If a door open command has been received, the powered door closing is stopped at step 242. If a door open command has not been received, the system proceeds to step 244 (FIG. 13B).

At step 244, the system sets the powered latch 106 ("eLatch") to enable latching of the door. At step 246, the system determines if the door window is down. If the door window is not down a powered window drop (e.g. partial or full lowering of window glass 8) is performed as shown at step 248, and the process continues at step 250. If a door window is down at step 246, the process continues to step 250. At step 250, the powered door presenter 40 is actuated to retract the protective member 42.

At step 252, the powered latch 106 is set to accept power door closing to secondary, and the powered cinch 36 (FIG. 3) is actuated to fully close door 10. A powered cinch mechanism 36 having a sixth electrically-powered actuator 16 is shown schematically in FIG. 13. Examples of powered cinch mechanisms can be found in U.S. Pat. Nos. 9,004,570 and 9,951,547, the entire contents of each being incorporated by reference. Powered cinch mechanisms are generally known in the art, such that a detailed description of the powered cinch mechanism 36 is not provided herein.

At step 254 the system determines if the door 10 is fully closed and latched. If not, an alert signal (e.g. an audio warning) is provided as shown at step 256. If the door 10 is fully closed and latched, the process continues at step 258. At step 258, the system determines if a seat belt is engaged. Vehicle 1 may include one or more sensors that determine if a seat belt has been latched. At step 260, the system generates an alert signal if a seat belt has not been engaged at step 258. If a seat belt is engaged at step 258, the system proceeds to step 262, and the controller actuates (locks) the powered latch 106.

The process then continues to step 268 as shown at FIG. 13C. At step 264, the controller determines if the inside door handle has been actuated. Door handle actuation may comprise actuation of interior unlatch switch 112 (FIG. 4). If the inside door handle has not been actuated, the system does nothing as shown at step 266. However, if the inside door handle has been actuated, the process continues as shown as step 268, and the system determines if an occupant adjacent the inside door handle is light in weight (i.e. less than a predefined weight) (e.g. 40 lbs., 60 lbs., etc.). If the occupant is not light in weight, the process continues at step 270, and the system determines if the vehicle speed is under 3 kph. If the speed is not under 3 kph, the process continues at step 272, and the controller determines if the inside handle has been actuated twice within 3 seconds. If the handle has not been actuated twice within the 3 seconds, the system does nothing as shown at step 274. If the inside handle has been actuated twice within 3 seconds, the controller unlocks and unlatches the door as shown at step 276.

Referring again to step 268, if the occupant is light in weight, the process continues at step 278. At step 278, the controller determines if the inside handle has been actuated twice within 3 seconds. If the handle has not been actuated twice within 3 seconds, the controller does nothing as shown at 280. However, if the inside handle has been actuated twice within 3 seconds at step 278, the process proceeds to step 282, and the controller determines if the vehicle speed is under 3 kph. If the speed is not under 3 kph, the system does nothing as shown at 284. However, if the vehicle speed is under 3 kph at step 282, the controller unlocks and unlatches the door as shown at step 276.

As shown at step 286, the process then involves measuring the time for the door to open upon actuating the power door opening mechanism 30. As shown at step 288, the controller also monitors to determine if a powered door close request switch has been actuated, or if an exterior switch has been actuated, or if a BCM/phone app has been actuated. As discussed above, the system/controller does not necessarily operate in the specific sequence shown in FIGS. 13A-13D. Accordingly, it will be understood that some of the steps (e.g. step 288) may occur continuously or during certain operating conditions, and the individual steps do not necessarily occur in the specific sequence shown in FIGS. 13A-13D. If a request is received at step 288, the process continues to step 292 as shown in FIG. 13D. At step 292, the controller determines if the door capacitive sensor and/or pinch strip indicate that a person or object is in the path of the door closing. If a person or object is present, the powered door presenter 20 is actuated as shown at step 294 to cause "bounce back" to prevent pinching, and a user alert is generated at step 296. If a person or object is not detected in the path of the door at step 292, the process continues at step 298. At step 298 the controller determines if a user has exited the vehicle 1 and moved to at least a predefined distance from the vehicle 1. This can be determined by monitoring the position of a wireless device 26 (FIG. 2) or by other suitable means. If the user has not moved to at least a predefined distance, the system does nothing as shown at step 299. If the user has moved to at least a predefined distance at step 298, the process continues to step 300. At step 300, the powered door mechanism 30 is actuated to close the door, and the powered latch 106 is actuated to latch and close the door. If the vehicle 1 includes a cinching mechanism 36, the cinching mechanism 36 may also be actuated at step 300 to ensure that the vehicle is completely closed.

At step 302, the controller determines if the door is ajar. If the vehicle door is ajar, the controller prevents movement of the vehicle as shown at step 304. Step 304 may include sending a signal from the latch controller 108 to the body control module 140 to prevent vehicle movement.

If the door is not ajar at step 302, the process continues to step 306. At step 306, the e Latch controller 108 evaluates multiple sources of information and determines if it is appropriate to close the door at step 308. If it is not appropriate to close the door, the system does nothing as shown at step 310. However, if it is appropriate to close the door, the system proceeds to step 312, and the e Latch controller 108 actuates the powered door mechanism 30 to close the vehicle door. As shown at step 314, the door then closes to the secondary latch position, and the e Latch controller 108 actuates the powered actuator 16 of cinch mechanism 36 to cinch the door to the fully closed position. Finally, at step 318, the e Latch controller 108 sends a signal to the body control module 140 indicating that the doors are closed/latched, and that it is ok for the vehicle to move.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a body structure having a door opening;
a door structure that is movable between a closed position closing off the door opening, and a fully open position;
a frameless door glass system including a first electrically-powered actuator that can be actuated to move a glass window between open and closed positions;
a powered latch including a second electrically-powered actuator that can be actuated to unlatch the powered latch;
a powered door presenter having a third electrically-powered actuator that can be actuated to extend a push member to shift the door structure from the closed position to a partially opened position that is between the closed position and the fully open position; and
a controller operably connected to the first, second, and third electrically-powered actuators, wherein the controller is configured to:
actuate the first electrically-powered actuator to shift the glass window away from the closed position;
actuate the second electrically-powered actuator to unlatch the powered latch; and
actuate the third electrically-powered actuator to shift the door structure from the closed position to the partially open position after actuating the first and second electrically-powered actuators.

2. The vehicle of claim 1, wherein:
the controller is disposed in the door.

3. The vehicle of claim 1, including:
a powered door opening mechanism having a fourth electrically-powered actuator that can be actuated to shift the door structure to a fully open position from the partially open position; and wherein:
the controller actuates the fourth electrically-powered actuator after actuating the third electrically-powered actuator to shift the door structure from the partially open position to the fully open position.

4. The vehicle of claim 1, wherein:
the controller is configured to actuate the first electrically-powered actuator when a door release request is received by the controller.

5. The vehicle of claim 1, including:
a powered door protector including a protective member that is movably mounted to the door structure, and a fifth electrically powered actuator that can be actuated to shift the protective member from a retracted position to a deployed position relative to the door structure upon opening the door structure to thereby protect at least a portion of the door; and wherein:
the controller actuates the fifth electrically-powered actuator after actuating the third electrically-powered actuator to shift the protective member from the retracted position to the deployed position.

6. A vehicle door system, comprising:
a door;
a frameless door glass system having a movable powered window;
a powered latch;
a powered door presenter that can be actuated to extend a push member to shift the door from a closed position to a partially open position;
a powered door opening mechanism that can be actuated to shift the door structure to a fully open position from the partially open position;
a powered door protector that can be actuated to shift a protective member from a retracted position to a deployed position relative to the door upon opening the door to thereby protect at least a portion of the door; and:
a controller operably connected to the powered window, the powered latch, the powered door presenter, the powered door opening mechanism, and the powered door protector, wherein the controller is configured to:
actuate the powered window to shift the window away from the closed position when a door release request is received by the controller;
unlatch the powered latch;
actuate the powered door opening mechanism to shift the door from the closed position to the partially open position after actuating the powered window and unlatching the powered latch;
actuate the powered door opening mechanism after actuating the powered door presenter to shift the door from the partially open position to the fully open position; and
actuate the powered door protector after actuating the powered door presenter to shift the protective member from the retracted position to the deployed position.

7. The vehicle door system of claim 6, including:
a powered door cinching mechanism including an electrically-powered actuator that can be actuated to shift the door structure to a fully closed position from a partially closed position that is between the closed position and the fully open position.

8. The vehicle door system of claim 6, wherein:
the powered latch defines a locked state such that the powered latch does not unlatch when a door release request is received by the controller when the powered latch is in a locked state; and
the controller is configured to lock the powered latch when the controller receives a buckled signal indicating that seat belts have been buckled and also receives a fully closed signal indicating that the door structure is in a fully closed position.

9. The vehicle door system of claim 6, including:
a vehicle seat including a sensor that generates a light weight signal indicating that a seat of the vehicle is occupied by a light weight occupant having a weight below a predefined maximum, and generating a heavier weight signal indicating that a seat of the vehicle is occupied by a heavier weight occupant having a weight above the predefined maximum; and wherein:
when a light weight signal is received by the controller, the controller does not unlatch the powered latch unless at least two unlatch requests are received within a predefined time period and the vehicle is traveling at below a predefined speed.

10. The vehicle door system of claim 9, wherein:
when the controller receives a heavier weight signal and a single unlatch request, the controller unlatches the powered latch only if the vehicle is traveling below the predefined speed.

11. The vehicle door system of claim 9, wherein:
when the controller receives a heavier weight signal and two unlatch requests within the predefined time period the controller unlatches the powered latch even when the vehicle is traveling above the predefined speed.

12. The vehicle door system of claim 9, wherein:
the predefined time period is three seconds, and the predefined speed is three kph.

13. The vehicle door system of claim 9, wherein:
the predefined maximum weight is in the range of 40-80 lbs.

14. The vehicle door system of claim 6, wherein:
the controller is configured to actuate the powered door presenter to initially move the door, and the controller is configured to actuate the powered door opening mechanism while the door structure is moving due to actuation of the powered door presenter such that the door moves continuously from the closed position to the fully open position.

15. The vehicle door system of claim 6, including:
a sensor configured to determine when a user is in the path of the door when the door is open; and
wherein the powered door opening mechanism can be actuated to close the door, and the controller does not actuate the powered door opening mechanism to close the door when a user is in the path of the door.

16. The vehicle door of claim 6, wherein:
the controller is configured to cause the powered window to move away from the closed position when the powered door opening mechanism is actuated to close the door.

17. The vehicle door of claim 6, wherein:
the controller is configured to actuate the powered door presenter to retract the push member when the powered door opening is actuated to close the door.

18. The vehicle door of claim 6, wherein:
the powered door opening mechanism comprises a powered door check that selectively retains the door structure at one or more check positions between the closed and fully open positions.

19. The vehicle door of claim 6, wherein:
the door defines an outer edge, and wherein the protective member comprises a movable edge protector that is configured to shift outwardly away from the outer edge upon actuation of the powered door protector.

20. The vehicle door of claim 6, wherein:
the frameless glass door system includes a first electrically-powered actuator that can be actuated to move the powered window between open and closed positions;
the powered latch includes a second electrically-powered actuator that can be actuated to unlatch the powered latch;
the powered door presenter includes a third electrically-powered actuator that is configured to extend the push member;
the powered door opening mechanism includes a fourth electrically-powered actuator that is configured to move the door towards the fully open position;
the powered door protector includes a fifth electrically-powered actuator that is configured to move the protective member.

* * * * *